United States Patent
Cui et al.

(10) Patent No.: US 12,536,449 B1
(45) Date of Patent: Jan. 27, 2026

(54) SELF-SUPERVISED RETRIEVER OPTIMIZATION VIA ATTENTION-DERIVED FEEDBACK IN RETRIEVAL AUGMENTED GENERATION SYSTEMS

(71) Applicant: Intuit Inc., Mountain View, CA (US)

(72) Inventors: Wendi Cui, Jersey City, NJ (US); Damien J. Lopez, San Diego, CA (US); Amit Agarwal, Fremont, CA (US); Joel D. Atwood, San Diego, CA (US); Palak Samel, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/313,736

(22) Filed: Aug. 28, 2025

(51) Int. Cl.
  *G06N 5/022* (2023.01)
  *G06F 16/3329* (2025.01)
  *G06N 20/00* (2019.01)

(52) U.S. Cl.
  CPC ......... *G06N 5/022* (2013.01); *G06F 16/3329* (2019.01); *G06N 20/00* (2019.01)

(58) Field of Classification Search
  CPC ........ G06N 20/00; G06N 20/10; G06N 20/20; G06N 5/02; G06N 5/022; G06N 5/025; G06N 5/04; G06F 16/33; G06F 16/332; G06F 16/3329
  See application file for complete search history.

(56) References Cited

U.S. PATENT DOCUMENTS

| | | | |
|---|---|---|---|
| 2022/0067281 A1* | 3/2022 | Hu | G06F 40/30 |
| 2025/0181974 A1* | 6/2025 | Wang | G06N 20/00 |
| 2025/0315897 A1* | 10/2025 | Vanscavish | G16H 10/60 |

OTHER PUBLICATIONS

Yue et al., "Automatic Evaluation of Attribution by Large Language Models", EMNLP 2023 Findings, Oct. 7, 2023, 21 Pages, arXiv:2305.06311v2 [cs.CL].
Asai et al., "Self-RAG: Learning to Retrieve, Generate, and Critique through Self-Reflection", International Conference on Learning Representations, Oct. 17, 2023, 30 Pages, arXiv:2310.11511v1 [cs.CL].

\* cited by examiner

*Primary Examiner* — Shane D Woolwine
(74) *Attorney, Agent, or Firm* — Dinsmore & Shohl LLP

(57) ABSTRACT

Certain aspects of the disclosure provide a method for updating a retrieval augmented generation (RAG) system. The method includes receiving a user query and retrieving a set of datasets from an external knowledge base associated with a language model. The user query and retrieved datasets are provided to the language model as input tokens, which generates a response comprising output tokens. The system then extracts cross-attention weights from the language model, indicating how much attention each output token paid to each input token. Using these weights, the system generates attention scores for each dataset and identifies a top-k set of most attended datasets. If the generated response is determined to be relevant to the user query, the top-k most attended datasets are labeled as positive examples. The system then updates its parameters to prioritize retrieving these positive examples for future queries, enabling continuous self-supervised improvement.

20 Claims, 9 Drawing Sheets

| Output Tokens 502 | Confidence Scores 504 |
|---|---|
| According | 0.94 |
| to | 0.95 |
| the | 0.93 |
| IRS | 0.95 |
| tax | 0.92 |
| code, | 0.95 |
| 401(k) | 0.93 |
| contributions | 0.92 |
| are | 0.94 |
| tax-deferred | 0.78 |
| while | 0.77 |
| the | 0.75 |
| Platinum | 0.48 |
| Tax | 0.52 |
| Relief | 0.51 |
| Program | 0.47 |
| allows | 0.54 |
| citizens | 0.87 |
| to | 0.91 |
| claim | 0.85 |
| up | 0.89 |
| to | 0.9 |
| $12,000 | 0.45 |
| in | 0.87 |
| additional | 0.84 |
| exemptions. | 0.82 |

FIG. 5

SELF-SUPERVISED RETRIEVER OPTIMIZATION VIA ATTENTION-DERIVED FEEDBACK IN RETRIEVAL AUGMENTED GENERATION SYSTEMS

BACKGROUND

Field

Aspects of the present disclosure relate to generative artificial intelligence.

Description of Related Art

Generative artificial intelligence (GenAI) refers to machine learning models that are able to create new content based on patterns and information learned from training data in combination with a user prompt. The user prompt provides instructions to the model on what new content to generate and how to generate that new content. Notably, the model is able to generate new content based on both the actual information (e.g., facts, knowledge) included in the training data, as well as patterns, insights, and model parameter weights learned from the training data.

GenAI models are able to generate new content in many different forms, including text, image, audio, and even video. For example, to facilitate text generation, some GenAI models are configured as language models (LMs). An LM is generally a type of machine learning model that is designed to understand, generate, and manipulate human language. More specifically, an LM is a probabilistic framework that determines the likelihood of a sequence of words or tokens. At its core, a LM attempts to predict the probability of the next word in a sentence given the preceding words. The model estimates these probabilities based on the patterns it learned during training. LMs are useful in natural language processing (NLP) and computational linguistics for performing a range of tasks involving human language.

LMs have a wide array of applications, including: text generation (e.g., producing coherent and contextually appropriate text; machine translation (e.g., converting text from one language to another); speech recognition (e.g., converting spoken language into text); text summarization (e.g., condensing a long piece of text into a shorter summary); sentiment analysis (e.g., determining the sentiment expressed in a piece of text); and question answering (e.g., automatically providing answers to questions posed in natural language).

LMs are often trained using large corpora of text. The training process involves adjusting the model's parameters to minimize the difference between its predicted word probabilities and the actual word sequences in the training data. This is typically done via techniques like maximum likelihood estimation and gradient descent. The training data set used at this stage of training is typically configured as a general-purpose training dataset, meaning the LM is trained to perform a wide range of tasks, including language understanding across many different knowledge domains. For example, LMs are trained on vast datasets that often include diverse and extensive sources of text from the internet, books, articles, and various other textual corpora (e.g., domain-specific corpora). The large volume of training data contributes to their broad generalization capabilities.

While language models represent a transformative force in many industries by assimilating vast amounts of knowledge, such as to build conversation-driven applications, these models are not without limitation. For example, while a powerful tool, a general-purpose LM may not be able to generate content and perform tasks related to specialized domains that were not represented in the original training data.

SUMMARY

Certain aspects provide a method for modifying a retrieval augmented generation system. The method includes receiving a user query; retrieving one or more knowledge segments from an external knowledge base associated with a language model based on the user query; providing a prompt comprising the user query and the one or more knowledge segments to the language model as a plurality of input tokens; receiving, from the language model, a first generated response to the user query, the first generated response comprising a first plurality of output tokens; determining that the first generated response is relevant to the user query; extracting, prior to generating a first set of attention scores, a first set of cross-attention weights of the language model, the first set of cross-attention weights indicating how much attention each output token of the first plurality of output tokens paid to each input token of the plurality of input tokens; generating the first set of attention scores, wherein each attention score corresponds to a respective knowledge segment of the one or more knowledge segments based on the first set of cross-attention weights; identifying, based on the first set of attention scores, a first top-k set of most attended knowledge segments corresponding to a first top-k subset of attention scores of the first set of attention scores; labeling, based on determining that the first generated response is relevant to the user query, the first top-k set of most attended knowledge segments as positive examples; and modifying one or more parameters of the retrieval augmented generation system to prioritize retrieving the positive examples.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 5 depicts a process flow diagram for updating a self-supervised RAG service based on positive contrastive learning.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
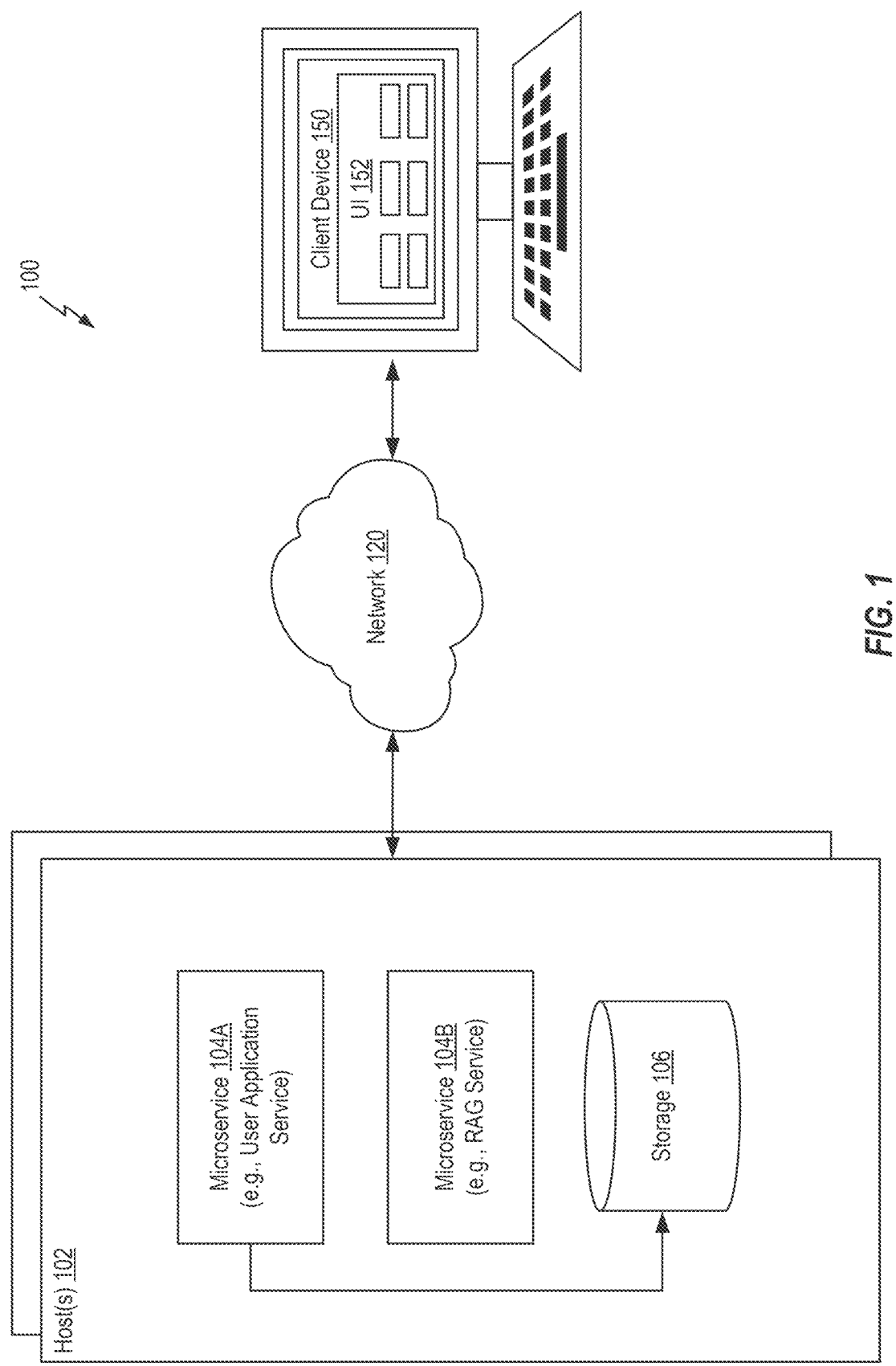
FIG. 1 depicts an example computing environment implementing one or more microservices.

LM training typically starts with an untrained model (e.g., a model that has randomly initialized weights), and trains it to predict a next token given a sequence of previous tokens. In the context of LMs, tokens may be units of text that the models process and generate. Tokens can represent individual characters, words, sub words, or even larger linguistic units, depending on the specific tokenization (e.g., segmentation of text into meaningful units to capture its semantic and syntactic structure) approach used. Tokens act as a bridge between the raw text data and the numerical representations that LMs are able process. Training data used to train an LM generally includes publicly available "raw text," for example, from books, articles, websites, and/or the like. To be highly capable (e.g., have linguistic and world knowledge), this text may span a wide range of fields, genres, languages, etc. Eventually, training on large amounts of text, the model learns to encode the structure of language in general (e.g., it learns, that "I like," for example may be followed by a noun or a participle) as well as the knowledge included in the raw texts that the model was exposed to during training. Because the training data spans a wide variety of domains, these trained models are often referred to as general-purpose LMs.

Although a trained LM is, due to the knowledge it encodes, able to perform a variety of tasks, the model may lack specific knowledge that is not encoded in its training data. This knowledge may include dynamic knowledge or domain-specific knowledge, to name a few. For example, dynamic knowledge refers to information that is constantly evolving, such as a user's age, an outstanding loan balance, stock prices, sensor data (e.g., such as from a thermostat inside a home), website analytics, and the like. Accordingly, knowledge available in the original training data may become static and fail to evolve over time; thus, such knowledge encoded by the LM may become outdated.

Domain-specific knowledge (also referred to as "domain knowledge") in machine learning (ML) refers to expertise and understanding of a specific field or subject matter (referred to herein as a "domain") to which an ML model is applied. Accordingly, LMs may suffer from a domain knowledge deficit where they lack detailed, specialized knowledge for a particular domain, such as finance, healthcare, law, etc. in the base training dataset. For example, a general-purpose LM (e.g., off-the-shelf LM) trained on publicly-available data may not be able to respond, or may respond incorrectly, to a domain-specific prompt, such as a prompt requesting information about a company's financial statements and/or accounts, a prompt requesting software code for an application, a prompt requesting information about employee retention at a particular company for a previous year, a prompt requesting customer help with an application and/or system internal to a company, and/or the like. The trained LM may not be able to respond, or may respond incorrectly, given the information that is requested is not part of a publicly available training data used to train the LM.

To address the shortcomings of LMs, some conventional approaches seek to combine and orchestrate LM functionality with other sources of knowledge. For example, retrieval augmented generation (RAG) is one approach that combines and orchestrates LM functionality with other sources of knowledge. In particular, RAG-enhanced LM systems can expand a model's generative capabilities by configuring the model to access external datasets outside its original training data. These external datasets can comprise data related to domain-specific knowledge. Models configured with RAG techniques are able to generate new content based on the user prompt and additional content retrieved, while still leveraging patterns learned from its original training data.

To implement RAG, data is indexed and stored in a database or other type of digital repository that allows for data retrieval. The data can be unstructured, like text, or structured, like knowledge graphs. In some instances, the data is encoded or vectorized to produce corresponding embeddings. Next, in response to receiving a user prompt, a data retrieval component works to select the most relevant datasets from the content databases. The relevant datasets can be retrieved by using vector comparison techniques based on comparing the vector representations of the underlying data and documents. These retrieved datasets will be used to augment the original user prompt, so that the model is able to generate new content based on the retrieved data and user prompt.

RAG can be used to improve the accuracy and reliability of LMs by providing access to additional content from external data sources that contain more up-to-date data, such as dynamic data, than the original training data used to train the model, or that contain domain-specific data (as compared to training data which is usually domain-independent). By implementing RAG, models are able to generate responses to user prompts that are more customized to the user domain. Additionally, the quality of the responses is improved because the model is able to pull content from vetted sources, meaning not only will the response be more relevant to the user prompt, but it will also be more accurate. Beneficially, RAG allows a system to leverage the capabilities of an LM, notably even the extensive scale of an LLM model, without having to perform fine-tuning on the LM. By avoiding the need for additional training, RAG-enabled LMs do not require the extensive computational resources associated with fine-tuning of the model.

However, even though RAG reduces the amount of computational resources needed to adapt the model to updated or new domains, compared to training and fine-tuning, RAG-enabled LMs still experience technical problems. For example, a technical problem arises in that, unlike traditional search engines, RAG systems lack effective feedback mechanisms to continuously improve the quality of document retrieval. In conventional search engines, user interactions such as clicks provide valuable signals that can be used to refine and optimize search rankings over time. In contrast, RAG systems typically present users with synthesized answers rather than direct links to source documents, resulting in the loss of explicit user engagement data. This absence of click-based or granular feedback prevents the retriever component from learning which documents were actually helpful or relevant to a given query, thereby limiting the system's ability to adapt and improve retrieval accuracy. Without the ability to adapt and improve retrieval accuracy, RAG systems are prone to issues such as retrieving irrelevant or unhelpful documents, increased hallucination in generated responses, and latency in retriever performance, especially in dynamic or specialized domains where user needs and content relevance may evolve rapidly.

Accordingly, aspects described herein overcome the aforementioned technical problems and improve upon the state of RAG art by introducing systems and methods associated with a self-supervised RAG service. "Self-supervised" refers to a type of machine learning or optimization process in which a system generates its own training signals or feedback from the data and internal model behavior, rather than relying on external labels or explicit supervision from human annotators. In the context of a self-supervised RAG service, the system leverages implicit signals-such as attention patterns, model confidence, or response quality assessments-derived from its own operations to continuously improve and optimize its components, such as the retriever, without requiring manual labeling or explicit user feedback for each training instance.

In particular, the self-supervised RAG systems herein leverage attention maps generated by LMs during answer synthesis to derive implicit feedback signals that indicate which retrieved documents were most influential in producing a given response. These attention-derived signals are then used to simulate user feedback, enabling the retriever component to be continuously fine-tuned or re-ranked based on actual model behavior, rather than relying on explicit user interactions. This approach allows for automated, scalable, and domain-adaptive optimization of document retrieval, resulting in more relevant, accurate, and up-to-date responses in RAG systems. In some aspects, fine-tuning refers to the process of adjusting the parameters of a machine learning model, such as an embedding-based retriever, using additional training data or feedback signals to improve its performance, typically by modifying the model's internal representations so that queries and relevant knowledge segments are mapped closer together in the embedding space. In some aspects, re-ranking refers to the process of adjusting the order or ranking of retrieved documents or knowledge segments, such as in a traditional search engine, based on feedback signals, so that more relevant or helpful items are placed higher in the results list, without necessarily changing the underlying model parameters or representations. Fine-tuning is generally used for dense, embedding-based retrievers, while re-ranking is commonly applied to keyword-based or classical retrieval systems.

In addition to enabling continuous and automated retriever optimization, this approach provides several further technical benefits. By utilizing attention-derived feedback, aspects of the self-supervised RAG systems herein can adapt to evolving user needs and dynamic content domains without requiring costly and time-consuming manual labeling or retraining. This implicit feedback mechanism also reduces the risk of retriever stagnation and mitigates issues such as retrieval of outdated or irrelevant documents, thereby decreasing the likelihood of hallucinated or low-quality responses. Furthermore, the approach is model-agnostic and can be integrated with a variety of retriever architectures, including both dense embedding-based and traditional keyword-based systems. The self-supervised RAG systems also support fine-grained document ranking and selection, allowing for more precise alignment between user queries and retrieved content. Overall, these technical benefits contribute to improved system robustness, scalability, and responsiveness in real-world RAG deployments.

Example System Implementing a RAG Service in a User Application Service

FIG. 1 depicts an example system 100 supporting a plurality of microservice(s) 104 (e.g., software-defined services, which in some cases, may be cloud-native). As shown in FIG. 1, system 100 includes a client device 150 and a host 102. Network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more of the microservice 104A and microservice 104B (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of hardware platform of host 102). Generally, a microservice is a loosely coupled and independently deployable service or software that, alone or in combination with one or more other microservice(s) 104, may make up an application. Microservice(s) 104 may enable segmented, granular level functionalities within a larger system infrastructure. A reference to a single microservice can encompass multiple microservice(s) 104, unless context indicates otherwise.

Client device 150 may include a user interface (UI), such as UI 152. UI 152 may be usable to communicate with microservice(s) 104 via network 120. For example, communication between client device 150 and one or more of microservice(s) 104 may be facilitated by one or more application programming interfaces (APIs). An API is a set of rules and protocols that allows different software applications to communicate and share data with each other. Non-exhaustive examples of client device 150 may include a smartphone, a personal computer, a tablet, or a laptop computer. In some examples, microservice(s) 104 may interact with another microservice, an application, a host, or the like, via network 120.

As shown in FIG. 1, in certain aspects, microservice 104A implements a user-application service, such as a question-answer plugin. A question-answer plugin is a type of user interface that is configured for submitting and answering user queries. Question-answer plugins can also be referred to as automated assistants or chatbots, which are configured to simulate conversations with human users and provide answers or perform tasks based on user queries. In certain aspects, microservice 104B implements a self-supervised RAG service according to the aspects described herein.

In the context of a question-answer plugin, when users ask a question, the RAG service tries to identify the right sources of content to aid in generating the response. By continuously learning and updating the RAG service based on attention-derived feedback, the RAG-enabled LM is able to generate higher quality, more relevant, more accurate, and more helpful responses to user queries, thereby also improving the overall user experience with the question-answer plugin. It should be appreciated that while the embodiments herein are described in reference to question-answer plugins, the present embodiments can be used in many different applications that rely on RAG-enabled LM content generation.

Though FIG. 1 depicts host 102, storage 106, and client device 150 as single devices for ease of illustration, one or more of host 102, storage 106, and/or client device 150 may be embodied in a variety of forms. Further, though FIG. 1 depicts only one host and one client device, other examples may include a different number of hosts and/or client devices. Client device 150 may use any combination of microservice(s) 104 on any host 102 where microservice(s) 104 are deployed.

Retrieval Augmented Generation

Figure 2:
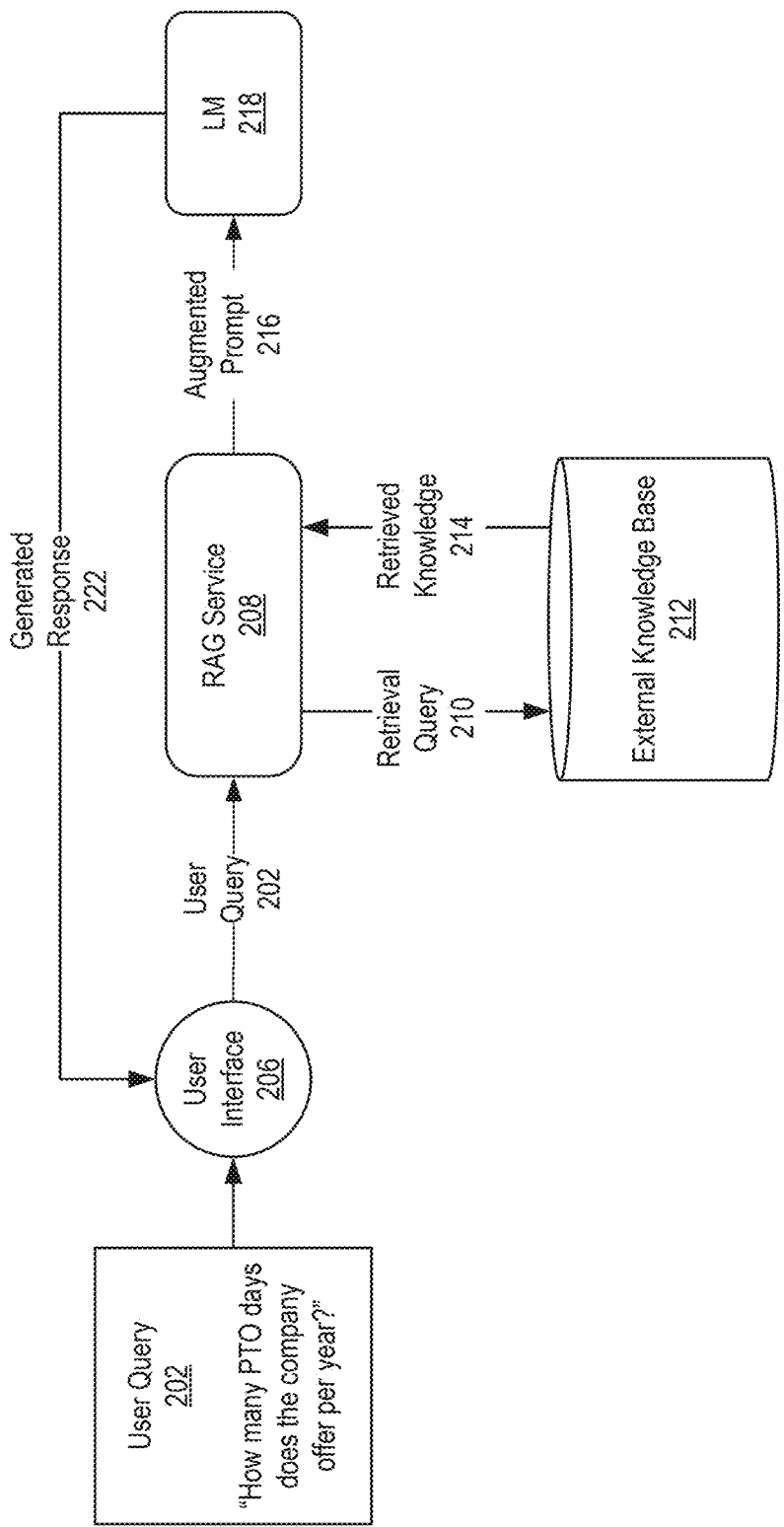
FIG. 2 depicts a process flow diagram for performing retrieval augmented generation (RAG).

FIG. 2 depicts a process flow diagram for performing RAG. In particular, FIG. 2 depicts a user interface 206, a RAG service 208, an external knowledge base 212, and an LM 218. In some aspects, RAG service 208 is comparable to a RAG service of microservice(s) 104 of FIG. 1. User interface 206 is configured to receive user input, including one or more user queries, such as user query 202. A user query is a prompt, question, and/or instruction that a user provides to an LM, such as LM 218, to elicit a response or output from the LM. In a non-RAG system, the LM will generate a response based on its original training data.

In a RAG-system, the LM is able to access information and data that is external to its original training data, such that the external data augments the response generation, in order to improve the accuracy and relevancy of the LM response to the user query. Thus, in some aspects, RAG service 208 is configured to implement a RAG process using external knowledge base 212 and LM 218.

The external knowledge base 212 comprises knowledge that the RAG service 208 is able to select and retrieve for use in generating responses. Knowledge refers to any information, data, or content that may be used for addressing a user query. Knowledge may include, but is not limited to, unstructured data, structured data, factual or relational information, domain-specific corpora, real-time or dynamic data feeds, and any other form of information that can be stored in or accessed from the external knowledge base 212.

Unstructured data may comprise documents, such as articles, technical manuals, research papers, product documentation, internal company reports, customer support tickets, or legal contracts. In addition to unstructured data, the external knowledge base 212 can also include structured data sources such as databases, spreadsheets, knowledge graphs, and tables containing factual or relational information. Other examples of datasets that may be included are web pages, FAQs, code repositories, email archives, chat logs, policy documents, regulatory filings, and multimedia content with associated metadata.

The external knowledge base 212 may further encompass domain-specific knowledge, such as medical records, financial statements, engineering specifications, or proprietary business data, as well as real-time or dynamic data feeds like news updates, sensor data, or transaction logs. This diversity of datasets enables the RAG service to access a wide range of information sources, both public and private, to generate more accurate and contextually relevant responses.

In some aspects, external knowledge base 212 includes information that is confidential and secured within a private company's network. This private information is not available publicly, for example, it is not part of the LM's original training data, which may have been publicly available training data. By implementing a RAG service in this manner, LM 218 can leverage the public training data and private company data, without comprising the security and confidentiality of the private company data included in the external knowledge base 212. This is because any information retrieved from the external knowledge base 212 is only used during inference to generate the generated response 222 and is not used to further train LM 218.

As illustrated in FIG. 2, user query 202 is provided to RAG service 208, which configures user query 202 as a retrieval query 210. The retrieval query 210 is configured to retrieve knowledge from the external knowledge base 212 that is predicted to be relevant to responding to the user query 202. The retrieved knowledge 214 comprises one or more knowledge segments. A knowledge segment refers to an individual portion of knowledge retrieved from the external knowledge base 212. A knowledge segment may comprise a document, a passage, a paragraph, a sentence, a data entry, a table row, or any other discrete piece of information that can be separately identified and utilized by the retrieval augmented generation system. Knowledge segments are selected based on their predicted relevance to the user query and are used as contextual input for generating responses.

The retrieved knowledge 214 from external knowledge base 212 is returned to RAG service 208. Thereafter, RAG service 208 generates an augmented prompt 216, based on user query 202 and the retrieved knowledge 214, to instruct LM 218 to generate a response, such as generated response 222, to user query 202 using the retrieved knowledge 214 and information available in the LM's original training data. The augmented prompt 216 is a language model prompt where the user query 202 has been augmented with the retrieved knowledge 214. Augmented prompt 216 may further comprise instructions, which are automatically generated by the RAG service 208, for LM 218 on how to use the retrieved knowledge 214 to respond to user query 202.

Notably, generated response 222 may be a relevant response or an irrelevant response. A relevant response is a generated response that is relevant to user query 202, meaning that the relevant response comprises correct, non-hallucinated, and applicable information with respect to the user query for which the relevant response was generated. Conversely, an irrelevant response is a generated response that is not relevant to the user query 202. In other words, an irrelevant response is a generated response that comprises incorrect, hallucinated, and/or non-applicable information with respect to the user query for which the irrelevant response was generated.

LMs may generate irrelevant responses because, even when using a RAG service, the quality and relevance of the generated answer depend on both the retriever's ability to select appropriate knowledge from the external data sources and the LM's ability to synthesize information from that knowledge. If the RAG service selects knowledge that is not sufficiently relevant or do not contain the necessary information to address the user's query, the LM may generate a response based on incomplete, tangential, or unrelated content. Additionally, the LM may not always accurately interpret or prioritize the most pertinent information from the retrieved datasets, especially if the datasets are large, comprise noisy data, and/or only partially relevant. This can result in responses that are off-topic, factually incorrect, or fail to address the user's intent associated with the user query, despite the presence of a retrieval mechanism. Furthermore, if the external knowledge base is outdated or lacks coverage for the query topic, the LM may be more likely to produce hallucinated answers.

Accordingly, aspects of the disclosed response generation systems herein specifically improve upon the RAG architecture by introducing a self-supervised feedback mechanism that is uniquely tailored to the technical environment of retrieval-augmented generation systems. Unlike conventional RAG architectures, which lack granular feedback and rely solely on static retrieval algorithms, the disclosed services, systems, and methods leverage attention-derived signals from large language models to generate implicit relevance feedback at the document and segment level. This feedback is used to continuously fine-tune or re-rank the retriever component within the self-supervised RAG service, directly addressing the absence of user click data and enabling dynamic, automated adaptation to evolving user queries and knowledge bases. As a result, the self-supervised RAG service achieves more accurate, contextually relevant, and up-to-date responses, while reducing the risk of retrieval stagnation and hallucinated outputs than existing RAG services.

Self-Supervised RAG Service

Figure 3:
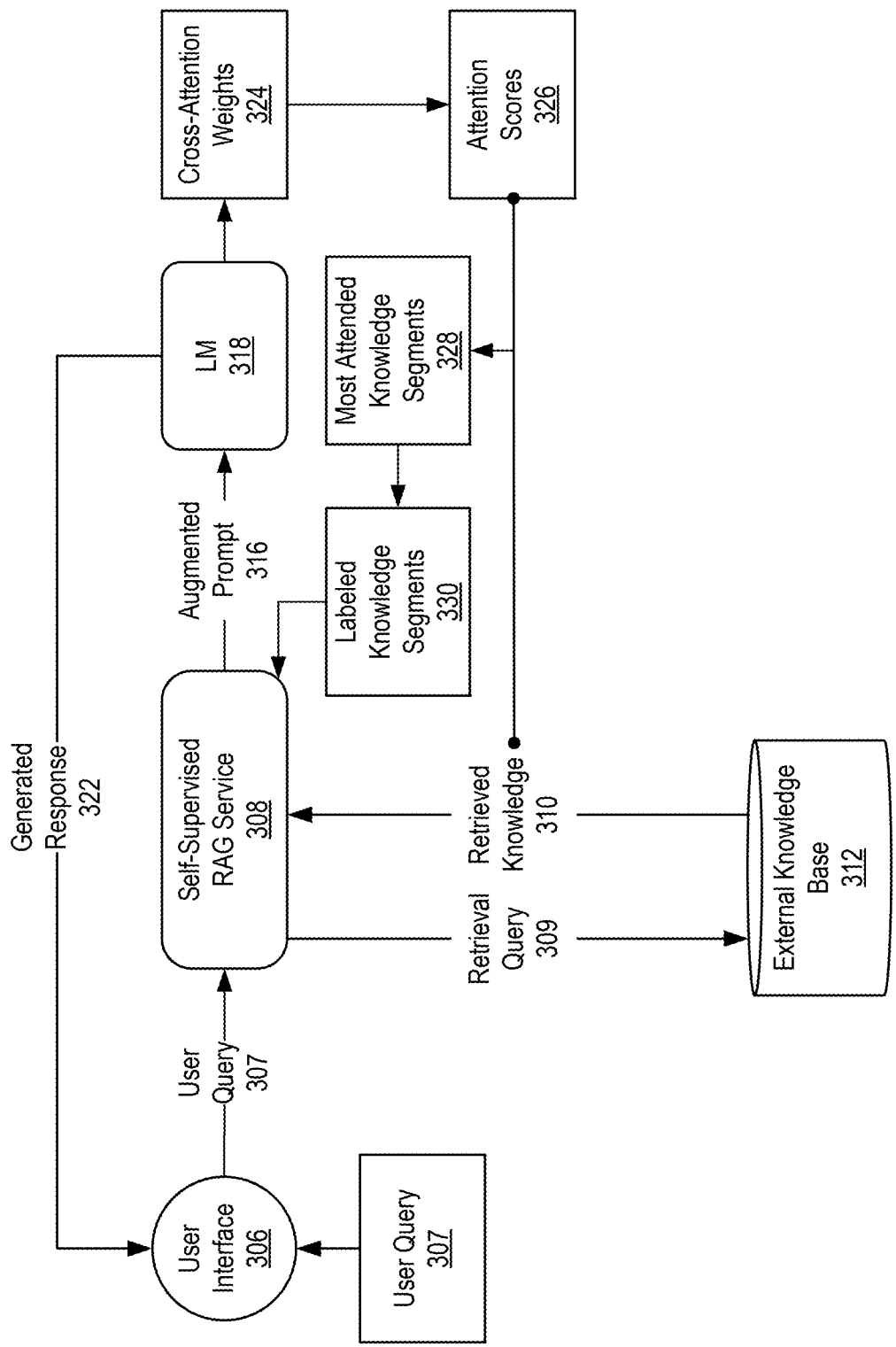
FIG. 3 depicts a process flow diagram for updating a self-supervised RAG service.

FIG. 3 depicts a process flow diagram for updating a self-supervised RAG service. FIG. 3 depicts a user interface 306, a self-supervised RAG service 308, an external knowledge base 312, and an LM 318. In some aspects, self-supervised RAG service 308 is one of microservice(s) 104 of FIG. 1. In some aspects, user interface 306 is comparable to user interface 206 of FIG. 2, external knowledge base 312 is comparable to external knowledge base 212 of FIG. 2, and LM 318 is comparable to LM 218 of FIG. 2.

In particular, user interface 306 is configured to receive user input, including one or more user queries, such as user query 307. User query 307 comprises a plurality of input tokens. User query 307, received at user interface 306, is provided to self-supervised RAG service 308, which configures user query 307 as a retrieval query 309. The retrieval query 309 is configured to retrieve knowledge from the external knowledge base 312 that is predicted to be relevant to responding to the user query 307. The retrieved knowledge 310 from external knowledge base 312 is returned to self-supervised RAG service 308. Thereafter, the self-supervised RAG service 308 generates an augmented prompt 316, based on user query 307 and the retrieved knowledge 310, to instruct LM 318 to generate a response (e.g., generated response 322) to user query 307 using the retrieved knowledge 310 and information available in the LM's original training data. Generated response 322 is then provided to a user by sending generated response 222 to user interface 306, which is configured to display the generated response 322 to the user.

In some aspects, the augmented prompt 316 also comprises instructions for the LM 318 to output one or more cross-attention weights used by the LM 318 during the response generation process. A cross-attention weight refers to a numerical value generated by a language model during the response generation process that quantifies the degree of attention or focus each output token pays to each input token. In the context of retrieval augmented generation, cross-attention weights indicate how much influence each part of the input—such as user queries and retrieved knowledge segments—has on the generation of each output token in the model's response. These cross-attention weights are typically computed across multiple layers and attention heads within the language model and can be aggregated to assess the relative importance of different input tokens or knowledge segments in producing the final output.

Examples of cross-attention weights include, for instance, a scenario where the language model generates a response token, such as "tax rate," in a generated response to a user query that asks about corporate taxes. The cross-attention weights for this output token might show a high value associated with input tokens from a retrieved document containing the phrase "corporate tax rate for 2024," indicating that this particular document segment strongly influenced the generated response. In another example, if the model generates the output token "deadline," the cross-attention weights may be distributed across several input tokens, but with the highest weight assigned to a sentence in a retrieved document stating "the filing deadline is April 15." These weights can be represented as numerical values (e.g., 0.75 for the most relevant input token and lower values for less relevant tokens) and are typically computed for each output token across all input tokens, layers, and attention heads. By aggregating these values, the self-supervised RAG service 308 can determine which knowledge segments or documents were most influential in producing specific parts of the generated response.

The self-supervised RAG service 308 then generates a set of attention scores, such as attention scores 326. Each attention score corresponds to a respective knowledge segment of the retrieved knowledge 310 and is based on the cross-attention weights 324. For example, the self-supervised RAG service 308 generates a set of attention scores by analyzing the cross-attention weights produced by the language model during response generation. Specifically, for each knowledge segment of the retrieved knowledge 310, the self-supervised RAG service 308 aggregates the cross-attention weights 324 that indicate how much attention each output token in the generated response 322 paid to the input tokens associated with that knowledge segment of retrieved knowledge 310. This aggregation may be performed across multiple layers, attention heads, and output tokens within the language model to produce a single attention score for each knowledge segment. The resulting attention score reflects the overall influence or importance of the corresponding knowledge segment in generating the response, allowing the self-supervised RAG service 308 to identify which knowledge segments were relied upon the more than other knowledge segments of retrieved knowledge 310 for answering the user query and generating the response.

In some aspects, the generation of attention scores may be represented by the following:

$$a = G(q, D),$$

where $D = \{d_1, d_2, \ldots, d_k\}$ represents the top-k set of knowledge segments retrieved by the self-supervised RAG service (R), and the language model (G), such as LM 318, outputs the generated response (a). Beneficially, the self-supervised RAG service is modified using internal attention dynamics from the language model.

For each output token (t), layer (l), and attention head (h), the cross-attention weights from the decoder onto the retrieved context tokens (e.g., augmented prompt 316) are denoted as:

$$A_{l,h,t} \in \mathbb{R}^N$$

Let each knowledge segment ($d_i$) consist of a sequence of tokens indexed by $I_i$. The cross-attention weight on a knowledge segment at position (l, h, t) is:

$$a_i^{(l,h,t)} = \sum_{j \in I_i} A_{l,h,t,j}$$

The self-supervised RAG service 308 then aggregates the attention score for each knowledge segment. For example:

$$\bar{a}_i = \frac{1}{LHT} \sum_{l=1}^{L} \sum_{h=1}^{H} \sum_{t=1}^{T} a_i^{(l,h,t)}$$

Next, the self-supervised RAG service 308 then normalizes the attention scores across the top-k set of knowledge segments according to:

$$s_i = \frac{\bar{a}_i}{\sum_{j=1}^{K} \bar{a}_j}, \; s_i \in [0, 1]$$

After the self-supervised RAG service 308 generates an attention score for each knowledge segment based on the cross-attention weights, the attention scores 326 are used to identify the most attended knowledge segments among the retrieved knowledge 310. Specifically, the self-supervised RAG service 308 ranks the knowledge segments according to their respective attention scores, which quantify the degree of influence each segment had on the generation of the response. The knowledge segments with the highest attention scores are considered the most attended, as they contributed most significantly to the language model's output. The self-supervised RAG service 308 then selects a top-k subset of these knowledge segments (associated with the highest attention scores) as the most attended knowledge segments 328. In some aspects, k is a non-zero, positive integer.

Once the self-supervised RAG service 308 has identified the top-k set of most attended knowledge segments, these most attended knowledge segments 328 are labeled based on a relevancy assessment of the generated response. The process for determining the relevancy of a generated response is described in more detail in FIG. 4. If the generated response 322 is determined to be relevant, the top-k set of most attended knowledge segments are labeled as positive examples. If the generated response 322 is determined to be irrelevant, the top-k set of most attended knowledge segments are labeled as negative examples. This labeling process, described in more detail below with respect to FIG. 6, effectively imputes the positive or negative feedback received for the overall response down to the individual knowledge segments that most influenced the answer, without having to receive user feedback on each individual knowledge segment used in the generation process. These positive and/or negative examples are then used to modify one or more parameters of the self-supervised RAG service 308 in order to guide retriever optimization by prioritizing or de-prioritizing the retrieval of the labeled knowledge segments and any other knowledge segments that are similar or related to the positive or negative examples for responding to future user queries. Modification of the self-supervised RAG service 308 is described in more detail in FIG. 7.

Determining Relevancy of Generated Responses

Figure 4:
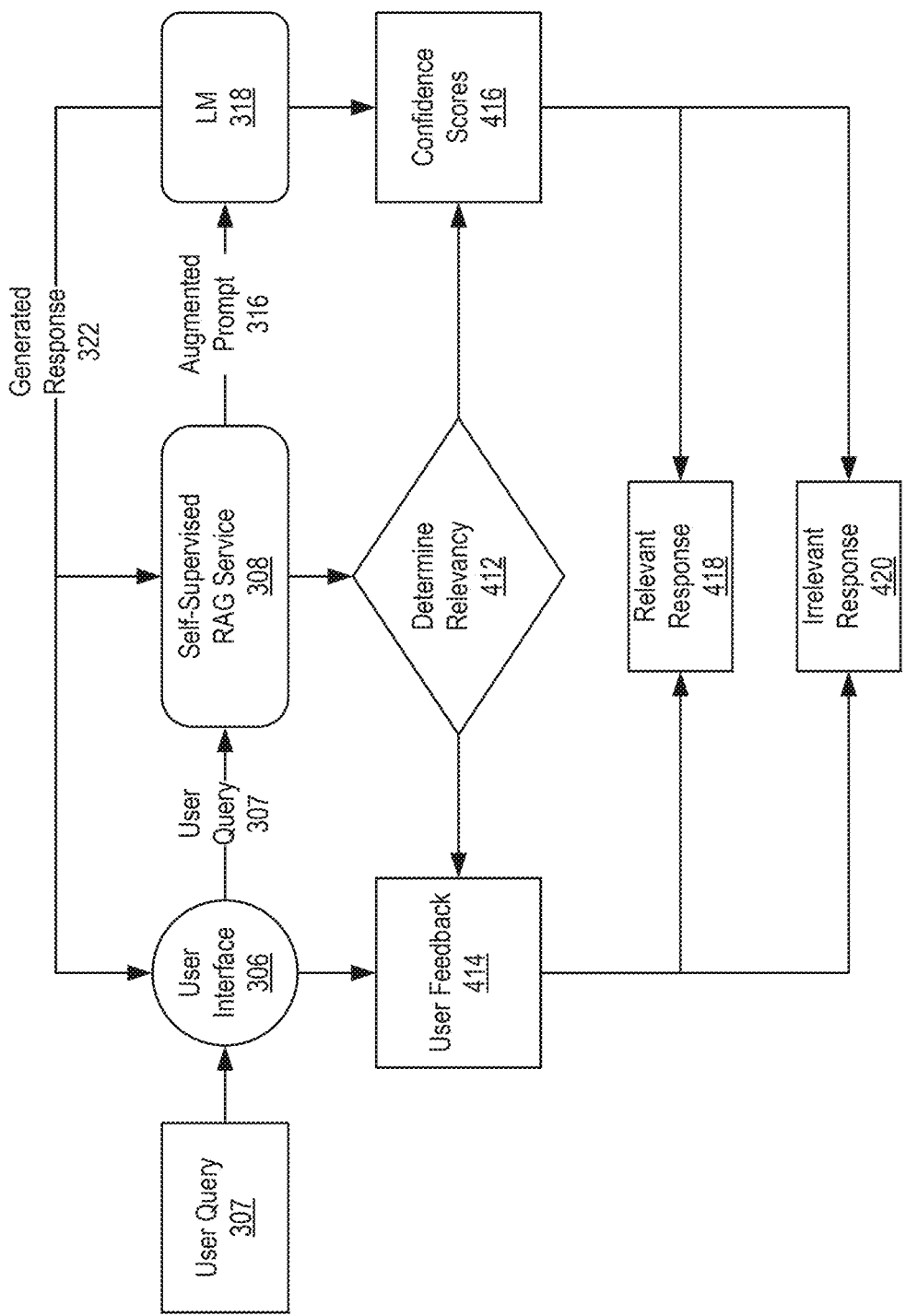
FIG. 4 depicts a process flow diagram for updating a self-supervised RAG service based on imputing positive user feedback.

FIG. 4 depicts a process flow diagram for determining the relevancy of generated responses and includes components described with respect to FIG. 3, including user query 307, user interface 306, self-supervised RAG service 308, augmented prompt 316, LM 318, and generated response 322. As shown in FIG. 4, the self-supervised RAG service 308 is able to determine the relevancy of the generated response 322 to the user query 307 based on user feedback 414, described below, and/or confidence scores 416, which are described in more detail in FIG. 5.

In some aspects, user feedback 414 comprises explicit input or other signals provided by the user that indicates the user's assessment of the quality or relevance of the generated response to their query. This may include, for example, actions such as selecting a thumbs-up or thumbs-down icon, providing a rating, or otherwise indicating whether the response satisfactorily addressed the user's needs. User feedback 414 serves as a supervisory signal that the self-supervised RAG service 308 can utilize to determine whether the generated response is relevant or irrelevant to the user query, and to guide subsequent optimization of the retrieval and response generation process.

When a user provides feedback, such as selecting a thumbs-up icon, giving a positive rating, or otherwise indicating satisfaction with the response, the self-supervised RAG service 308 interprets this as an indication that the generated response is relevant and has adequately addressed the user's needs. Other examples that could be an indication of positive feedback include actions such as the user continuing the conversation with follow-up questions related to the generated response, bookmarking or saving the response, sharing the response with others, copying content from the response, spending an extended amount of time viewing the response, or selecting an option to mark the response as helpful or useful. This positive feedback is then used to label the most attended knowledge segments as positive examples, which in turn guides the optimization of the retriever and improves the quality of future responses.

Conversely, if the user selects a thumbs-down icon, gives a negative rating, or otherwise indicates dissatisfaction, the self-supervised RAG service 308 interprets this as a signal that the response is irrelevant or unhelpful. Other examples that can be indications of negative feedback include actions such as the user quickly abandoning or closing the response, submitting a follow-up query that repeats or rephrases the original question (indicating the initial response was unsatisfactory), reporting the response as incorrect or unhelpful, providing a low rating, spending very little time viewing the response, or selecting an option to mark the response as not useful. This negative feedback is then used to label the most attended knowledge segments as negative examples, which in turn guides the optimization of the retriever and improves the quality of future responses.

Using user feedback on the generated response is still considered "self-supervised" in this context because the system does not require explicit, document-level labels or manual annotation for each knowledge segment used in response generation. Instead, the self-supervised RAG service leverages high-level feedback, such as a thumbs-up or thumbs-down on the overall response and/or automatically detects and interprets user behavior related to the generated response, to automatically infer which underlying knowledge segments were helpful or unhelpful in generating the response, based on the model's internal attention patterns. This approach allows the self-supervised RAG service 308 to generate its own training signals from automatically detected user interactions, rather than relying on curated datasets or detailed human supervision or feedback on each retrieval instance. As a result, the feedback loop for modifying the parameters of the self-supervised RAG service remains self-supervised, by autonomously using available signals to continuously improve the retrieval and response generation processes of the self-supervised RAG service.

This represents a specific improvement to machine learning training methodology by enabling the RAG service to autonomously generate and utilize training signals derived from real-time model behavior and user interactions, rather than depending on labor-intensive, manually curated datasets or explicit human annotation. By leveraging attention-derived feedback and implicit user signals, the self-supervised RAG service creates a dynamic, self-supervised training loop that continuously refines the retriever component's performance in response to actual usage patterns and evolving content domains. This not only reduces the cost and complexity associated with traditional supervised learning approaches but also allows the model to adapt more rapidly and effectively to new information and user needs. The result is a more robust, scalable, and contextually adaptive machine learning framework that directly addresses the limitations of static training data and manual retraining in conventional ML/RAG systems.

Confidence Scores

As described above, in some aspects, self-supervised RAG service 308 determines the relevancy of a generated response based on confidence scores associated with the generated response. Confidence scores are numerical values generated by the language model that quantify the LM's certainty or probability estimate for each output token and/or the overall generated response. These confidence scores are derived from the LM's internal probability distribution over the vocabulary, which is computed during the token generation process.

In particular, during the token generation process, the LM predicts the next token in a sequence by evaluating all possible tokens in its vocabulary. For each prediction step, the LM produces a set of raw output values known as logits, with one logit for each token in the vocabulary. These logits are then transformed into probabilities using, for example, a SoftMax function, which normalizes the values so that they sum to one and can be interpreted as probabilities. The probability assigned to each token represents the model's confidence that the token is the correct next token in the sequence, given the preceding context. The confidence score for the output token is equal to the probability value corresponding to that token. This process is repeated for each token generated in the output sequence, resulting in a confidence score for every token in the output tokens 502.

Because confidence scores reflect the language model's internal probability estimates for each generated token, confidence scores indicate how certain the model is about its output given the input context. When the model assigns high confidence scores to its output tokens, it means that, based on its learned patterns and the provided context, it strongly believes those tokens are the most appropriate and contextually accurate choices. As a result, responses with high aggregated confidence scores are more likely to be coherent, accurate, and relevant to the user's query.

Conversely, low confidence scores suggest that the model is uncertain about its predictions, which often occurs when the input context, such as the retrieved knowledge from an external knowledge base, is ambiguous, insufficient, or outside the model's training distribution. In such cases, the language model may generate responses that are less accurate, off-topic, or even hallucinated, making them less likely to be relevant to the user's needs. Therefore, there is a strong correlation between high confidence scores and relevance, and between low confidence scores and irrelevance, in the context of language model-generated responses. Accordingly, generated responses corresponding to high confidence scores are more likely to be relevant responses, while generated responses corresponding to low confidence scores are more likely to be irrelevant responses.

In some aspects, these individual token-level confidence scores can be aggregated, such as by averaging or computing a minimum value, to produce an overall confidence score for the entire generated response. If the aggregated confidence score meets or exceeds a confidence threshold, the self-supervised RAG service 308 may determine that the response is a confident response, and likely to be relevant. Conversely, if the confidence score falls below the confidence threshold, the response may be considered non-confident, and therefore, likely to be irrelevant. This automated assessment allows the self-supervised RAG service to make an initial determination of response relevancy without requiring explicit user feedback on the generated response, and can be used to guide further actions such as labeling knowledge segments as positive or negative examples for retriever optimization.

FIG. 5 depicts an example of a generated response, such as generated response 322, including a set of output tokens and a set of corresponding confidence scores. As shown in FIG. 5, output tokens 502 comprises a generated response: "According to the IRS tax code, 401K contributions are tax-deferred while the Platinum Tax Relief Program allows citizens to claim up to $12,500 in additional exemptions." In output tokens 502, each token, representing a word or phrase generated by the LM in response to a given user query, is associated with a numerical confidence score, such as confidence score included in confidence scores 504, that quantifies the model's certainty in predicting that particular token during the generation process. For example, the token "According" is associated with a confidence score of 0.94, indicating a high level of predictive certainty by the LM. Similarly, the token "to" is associated with a confidence score of 0.95, also indicating a high level of predictive certainty.

Labeling Knowledge Segments

Figure 6:
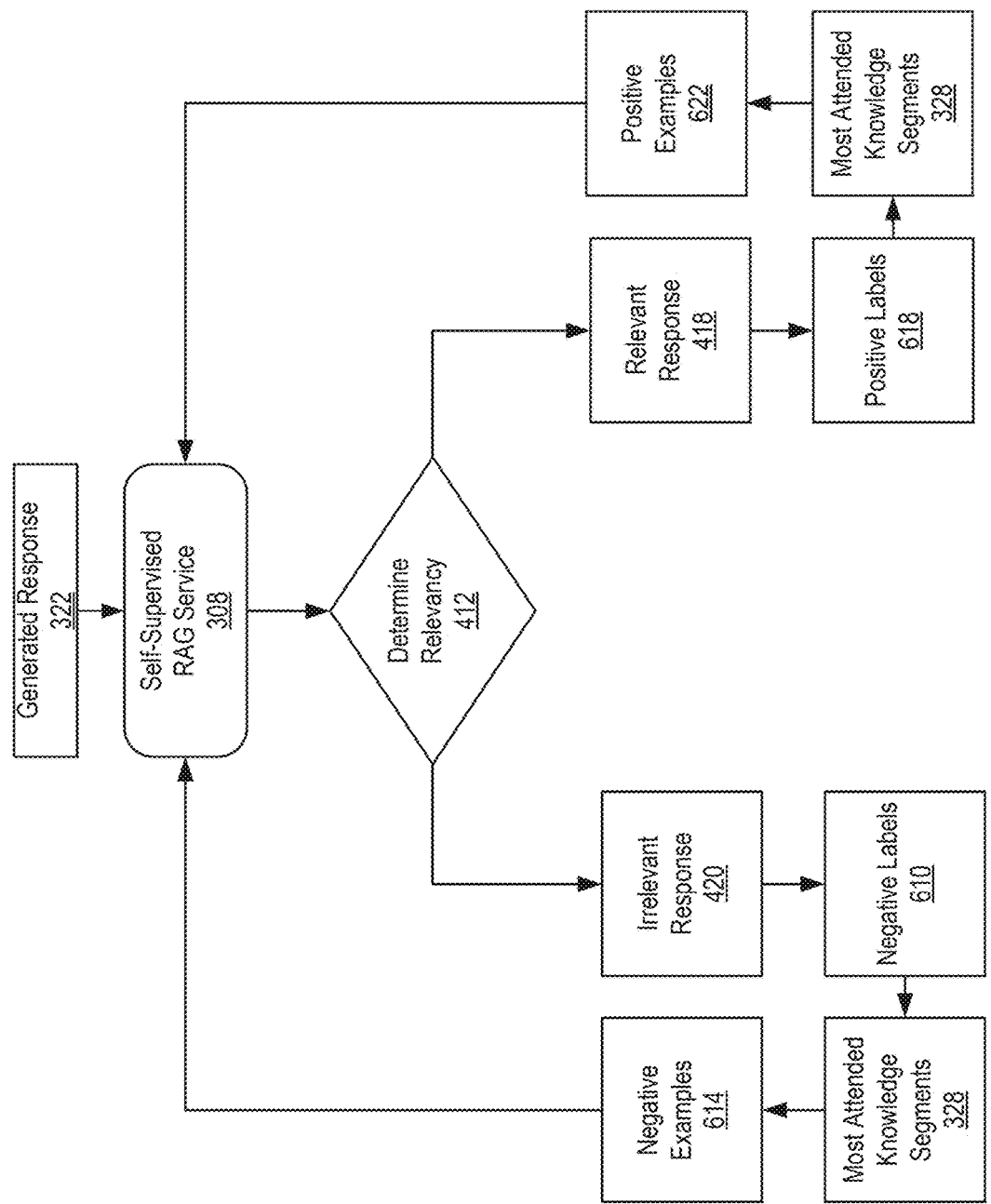
FIG. 6 depicts a process flow diagram for updating a self-supervised RAG service based on negative contrastive learning.

FIG. 6 depicts a process flow diagram for labeling knowledge segments, including components described in FIG. 3, such as generated response 322, self-supervised RAG service 308, and most attended knowledge segments 328. As described above, the self-supervised RAG service, for example at action 412, determines whether generated response 322 is a relevant response 418 or an irrelevant response 420 based on methods described with respect to FIGS. 4-5. Subsequent to determining the relevancy of the generated response 322, the self-supervised RAG service 308 is configured to generate labels and label the most-attended knowledge segments, in order to generate labeled knowledge segments, such as labeled knowledge segments 330 of FIG. 3. Labels refer to designations or tags assigned by the self-supervised RAG service 308 to specific knowledge segments based on their assessed contribution to the generated response. These labels typically indicate whether a knowledge segment is considered positive (e.g., relevant to the user query) or a negative (e.g., irrelevant).

For example, if generated response 322 is determined to be an irrelevant response 420, then the self-supervised RAG service 308 generates a set of negative labels that is applied to the most attended knowledge segments 328. If generated response 322 is determined to be a relevant response 418, then the self-supervised RAG service 308 generates a set of positive labels that is applied to the most attended knowledge segments 328 that were identified using attention scores generated based on cross-attention weights. Knowledge segments that are labeled with negative labels 610 are designated as negative examples 614, while knowledge segments that are labeled with positive labels 618 are designated as positive examples 622. The positive and/or negative examples are then used to modify one or more parameters of the self-supervised RAG service 308.

Modification of the self-supervised RAG service 308 depends on several factors, including whether the self-supervised RAG service is implemented using a search engine or an embedding model as the retriever component for retrieving knowledge from the external knowledge base.

Modifying a Search Engine Retriever Using Pseudo-Click Learning

In some aspects, self-supervised RAG service is configured with a search engine that serves as a retriever component that selects relevant documents or knowledge segments from an external knowledge base in response to a user query. The search engine uses keyword-based matching, Boolean queries, or classical ranking algorithms, such as term frequency-inverse document frequency (TF-IDF) or best match (BM25), to identify and rank documents that are most textually similar to the query. When a user submits a query, the search engine scans the knowledge base, retrieves a set of top-ranked documents, and passes these documents or knowledge segments to the language model. In conventional search engines, user interactions such as clicks on specific documents or links that are retrieved provide valuable signals that can be used to refine and optimize search rankings over time.

In contrast, RAG systems, including RAG systems that utilize a search engine for retrieval, present users with synthesized answers rather than direct links to source documents, resulting in the loss of explicit user engagement data associated with conventional search engines. This absence of click-based or granular feedback prevents the search engine of the RAG system from learning which documents were actually helpful or relevant to a given query, thereby limiting the RAG system's ability to adapt and improve retrieval accuracy. Without the ability to adapt and improve retrieval accuracy, RAG systems are prone to issues such as retrieving irrelevant or unhelpful documents, increased hallucination in generated responses, and latency in retriever performance, especially in dynamic or specialized domains where user needs and content relevance may evolve rapidly.

Accordingly, systems and methods are described herein where the self-supervised RAG service implementing a search engine can be modified using pseudo-click learning. Pseudo-click learning is a technique in which the self-supervised RAG service simulates user click feedback by leveraging internal model signals, specifically, attention-derived scores, to identify which retrieved documents or knowledge segments were most influential in generating a high-quality response. Instead of relying on explicit user clicks on individual knowledge segments, the self-supervised RAG service treats the most-attended documents (as determined by the attention scores) as if they were "clicked" or positively engaged by the user.

When responding to future user queries, the self-supervised RAG service uses the "clicked" knowledge segments to prioritize and increase the likelihood of retrieving those knowledge segments or similar or related segments for new user queries. Conversely, "unclicked" or less-attended knowledge segments are deprioritized, reducing the chances of being retrieved for similar queries in the future. This dynamic adjustment enables the RAG system to continuously improve its retrieval accuracy and relevance based on implicit feedback derived from prior model behavior.

Modifying an Embedding Model Retriever Using Contrastive Learning

Figure 7:
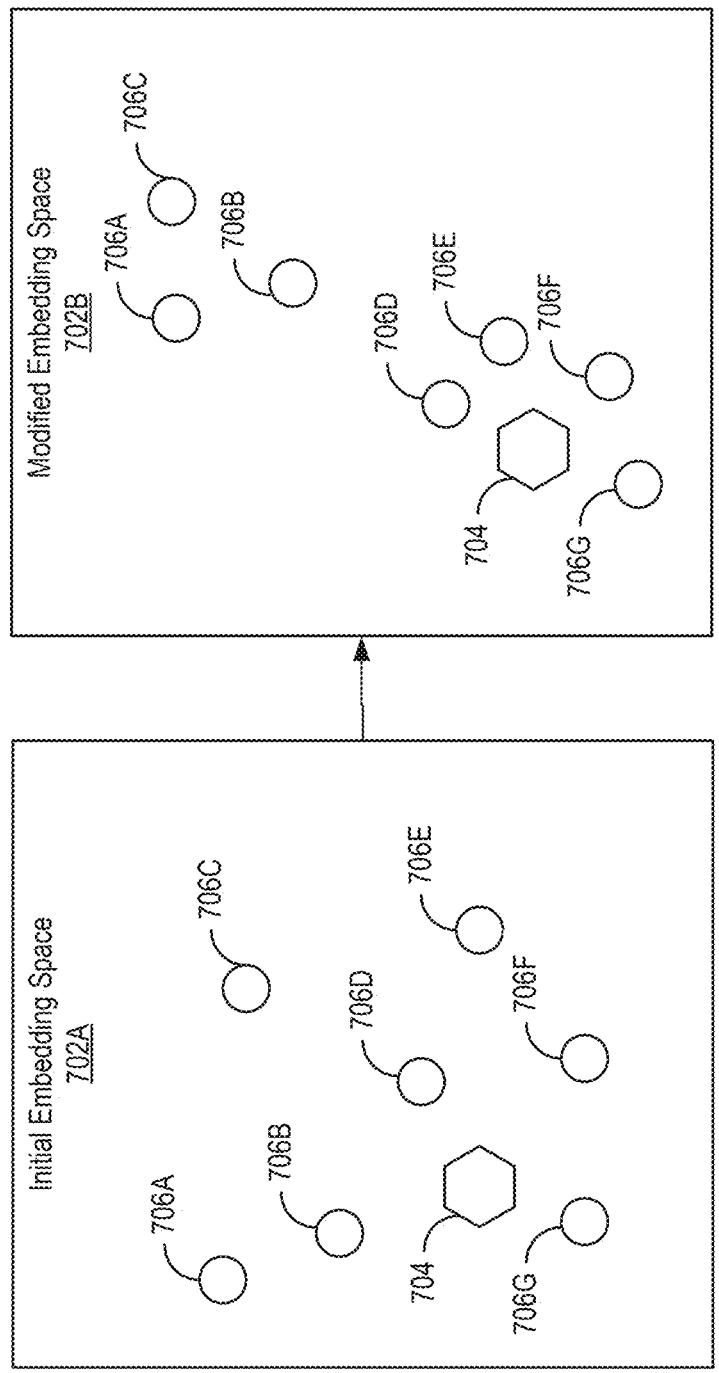
FIG. 7 depicts an example of a language model output including a set of tokens and a set of corresponding confidence scores.

In some aspects, the self-supervised RAG service is configured with an embedding model that serves as the retriever component responsible for selecting relevant documents or knowledge segments from an external knowledge base in response to a user query. Retrieval using an embedding model is referred to as dense retrieval. The embedding model works by converting both the user query and all candidate knowledge segments into high-dimensional vector representations, known as embeddings. For example, FIG. 7 illustrates an initial embedding space 702A which includes a plurality of mapped embeddings. As shown, initial embedding space 702A includes a user query embedding 704 and a plurality of knowledge segment embeddings, such as knowledge segment embedding 706A, knowledge segment embedding 706B, knowledge segment embedding 706C, knowledge segment embedding 706C, knowledge segment embedding 706D, knowledge segment embedding 706E, knowledge segment embedding 706F, and knowledge segment embedding 706G. In some aspects, user query embedding 704 is associated with user query 307 of FIG. 3, and the plurality of knowledge segment embeddings is associated with knowledge segments of external knowledge base 312 of FIG. 3.

Initially, the embedding model is configured such that semantically similar queries and knowledge segments are mapped closer together in the embedding space. For example, based on semantic similarity to the user query embedding 704, knowledge segment embedding 706G, knowledge segment embedding 706D, and knowledge segment embedding 706F are mapped closer to user query embedding 704; and knowledge segment embedding 706A, knowledge segment embedding 706C, and knowledge segment embedding 706E are mapped further away from user query embedding 704.

When a user submits a user query, the embedding model generates an embedding for the user query and compares it to the embeddings of all available knowledge segments in the external knowledge base. The embedding model then calculates similarity scores, often using measures such as cosine similarity, between the user query embedding and each knowledge segment embedding. The knowledge segments with the highest similarity scores are considered the most relevant and are selected for retrieval. These retrieved segments are then provided as context to the language model for answer generation. This approach enables the self-supervised RAG service to perform semantic search, capturing deeper relationships between queries and documents beyond simple keyword matching associated with search engine-based retrievers, and allows for more flexible and accurate retrieval of relevant information.

Contrastive Learning Based on Positive Examples

In aspects where an embedding model is used to perform dense retrieval, the self-supervised RAG service can utilize attention scores and contrastive learning to fine-tune the embedding model in a self-supervised manner. Contrastive learning refers to a machine learning technique in which a model, such as an embedding model, is trained to distinguish between similar and dissimilar pairs of data by bringing representations of similar pairs closer together in the embedding space and pushing representations of dissimilar pairs further apart. In the context of a self-supervised RAG service using an embedding model, contrastive learning is used to fine-tune the embedding model with the positive examples 622 of FIG. 6 corresponding to the positively-labeled most attended knowledge segments, thereby mapping user queries and positive examples closer together, further improving the accuracy and relevance of future retrievals.

In such aspects, the self-supervised RAG service identifies all knowledge segments in the retrieved knowledge and weights their contribution to the generated response by the attention-derived score. For example, in some aspects, positive contrastive learning may be represented by:

$$\mathcal{L}_{InfoNCE} = -\sum_{i=1}^{K} s_i \cdot \log \frac{\exp(\mathrm{sim}(q, d_i))}{\sum_{j=1}^{K} \exp(\mathrm{sim}(q, d_i))}$$

where K is the total number of candidate documents in the batch, including both relevant and irrelevant documents, q is a user query embedding, $d_i$ is a top-k knowledge segment retrieved by the embedding model, or embedding of the i-th candidate document of the total number of candidate documents and $s_i$ is the attention-derived weight for candidate document $d_i$.

Mapping user queries and positive examples closer together in the embedding space results in improved future retrieval because it increases the likelihood that, when a similar user query is submitted in the future, the fine-tuned embedding model will identify and select knowledge segments that are relevant to the user query. This improved retrieval process is not just based on semantic similarity to the user query (e.g., based on the initial embedding space 702A), but also beneficially based on prior feedback indicating which knowledge segments have previously contributed to high-quality, relevant responses (e.g., based on the modified embedding space 702B). This enables the self-supervised RAG service to leverage both semantic alignment and historical effectiveness in ranking and retrieving the most useful knowledge segments for new user queries. By reducing the distance between embeddings of user queries and their most helpful knowledge segments, the self-supervised RAG service ensures that relevant knowledge segments are also retrieved more efficiently during the response generation process. This self-supervised fine-tuning process enables the embedding model to better capture the true relationships between queries and content, leading to more accurate, contextually appropriate, and useful responses for subsequent user queries.

This approach provides a specific improvement to machine learning technology, such as training methodologies, by integrating attention-derived feedback directly into the training and optimization of the embedding model of a RAG service. Unlike conventional ML systems that rely solely on static training data or manual labeling, the self-supervised RAG service dynamically adjusts the embedding space using real-time signals from model behavior and user interactions. This enables the embedding model to learn not only from semantic similarity, but also from empirical evidence of what content has proven effective in actual response generation. As a result, the embedding model becomes more sensitive to context, relevance, and evolving user needs, allowing it to distinguish between truly useful and less helpful knowledge segments. This continuous, feedback-driven fine-tuning leads to a more adaptive, robust, and high-performing ML/RAG system that is better equipped to deliver accurate and relevant results in complex, real-world environments.

Contrastive Learning Based on Negative Examples

Contrastive learning may also be used for mapping user queries and negative examples. In particular, contrastive learning is used to fine-tune the embedding model with the negative examples, such as negative examples 614 of FIG. 6, corresponding to the negatively-labeled most attended knowledge segments, thereby mapping user queries and positive examples further apart.

In such aspects, the self-supervised RAG service reuses the contrastive loss defined above, but treats high attention knowledge segments as negatives ($d^-$) and contrasts them against known positives ($d^+$). For example, in some aspects, negative contrastive learning may be represented by:

$$\mathcal{L}_{InfoNCE} = -\log \frac{\exp(\mathrm{sim}(q, d^+))}{\exp(\mathrm{sim}(q, d^+)) + \sum_{d^-} \exp(\mathrm{sim}(q, d^-))}$$

where q is the user embedding, $d^+$ is the document that was retrieved (positive example), and $d^-$ is the document that was retrieved (negative example).

Mapping user queries and negative examples further apart in the embedding space results in improved future retrieval because it decreases the likelihood that, when a similar user query is submitted in the future, the fine-tuned embedding model will retrieve knowledge segments that have previously been identified as unhelpful or irrelevant. Like contrastive learning based on positive examples, this improved retrieval process is not just based on semantic similarity to the user query, but also incorporates prior feedback indicating which knowledge segments have contributed to low-quality or irrelevant responses. By increasing the distance between embeddings of user queries and their associated negative examples, the self-supervised RAG service effectively deprioritizes unhelpful content, ensuring that less relevant knowledge segments are less likely to be retrieved during the response generation process. This self-supervised fine-tuning process enables the embedding model to more accurately distinguish between useful and unhelpful content, leading to more contextually appropriate and higher-quality responses for subsequent user queries.

Example Method for Modifying a Self-Supervised RAG Service

Figure 8:
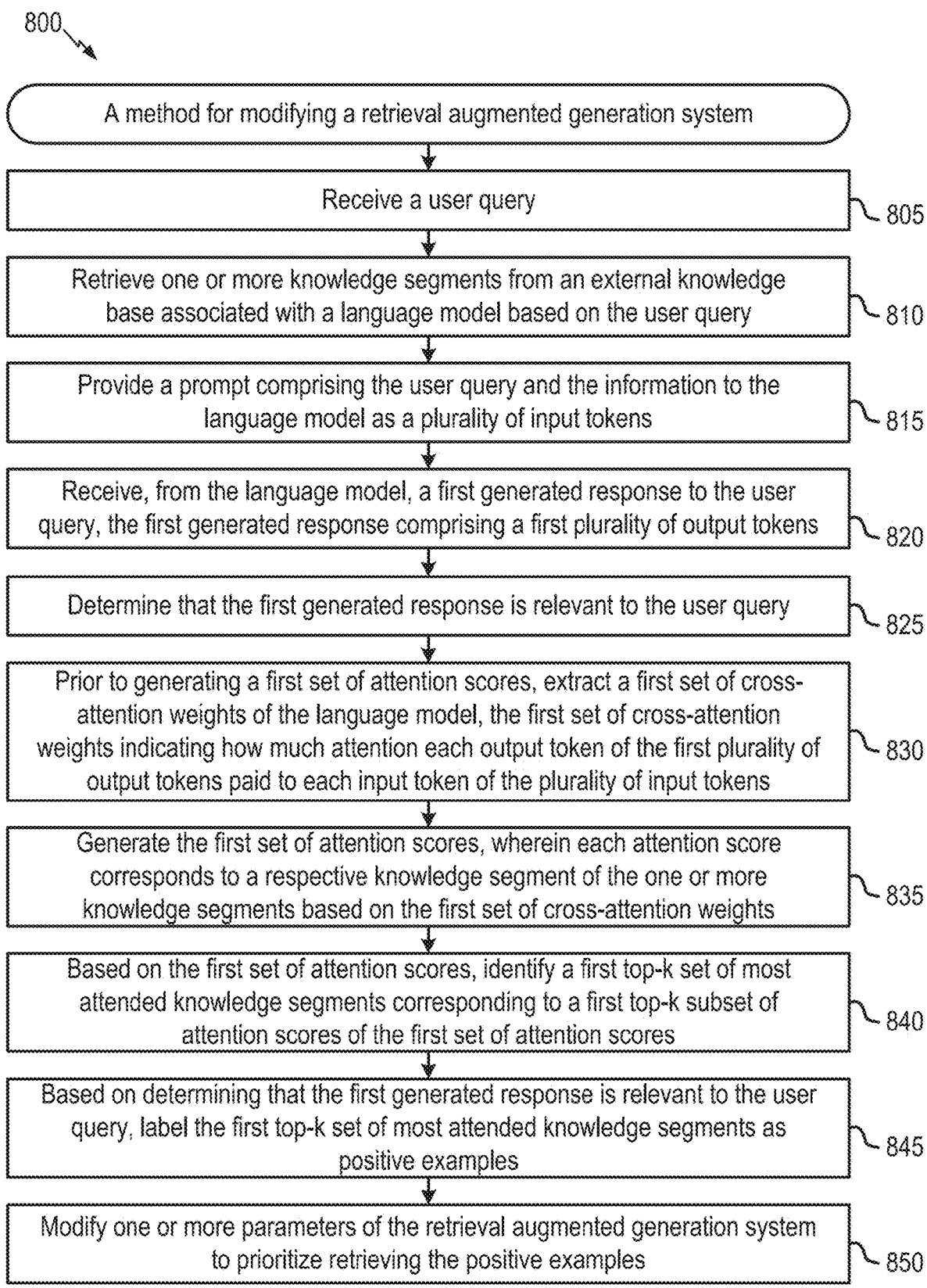
FIG. 8 depicts a flowchart associated with an example method for modifying a self-supervised RAG service.

FIG. 8 depicts an example method 800 for modifying a retrieval augmented generation system. In one aspect, method 800 can be implemented by the system 100 of FIG. 1 and/or processing system 900 of FIG. 9.

Figure 9:
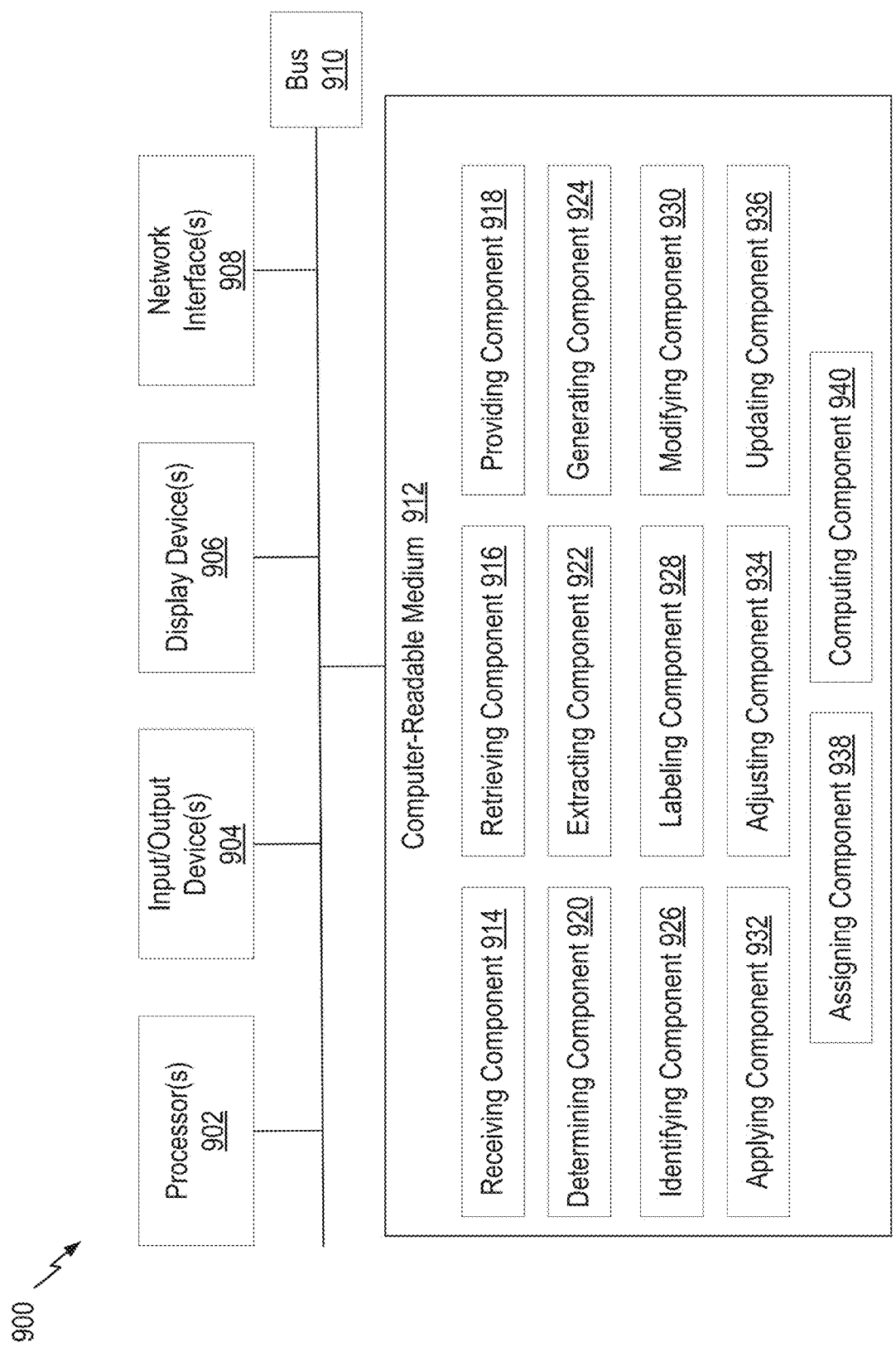
FIG. 9 depicts an example processing system with which aspects of the present disclosure can be performed.

Method 800 begins at block 805 with receiving a user query. In some aspects, receiving component 914 of FIG. 9 is configured to receive a user query, such as user query 202 of FIG. 2, from a user interface, such as user interface 206 of FIG. 2.

Method 800 then proceeds to block 810 with retrieving one or more knowledge segments from an external knowledge base associated with a language model based on the user query. In some aspects, retrieving component 916 of FIG. 9 is configured to retrieve one or more knowledge segments, such as retrieved knowledge 214 of FIG. 2, from external knowledge base 212 of FIG. 2, associated with a language model, such as LM 218 of FIG. 2, based on user query 202 of FIG. 2.

Method 800 then proceeds to block 815 with providing a prompt comprising the user query and the one or more knowledge segments to the language model as a plurality of input tokens. In some aspects, providing component 918 of FIG. 9 is configured to provide a prompt comprising the user query, such as user query 202 of FIG. 2, and the one or more knowledge segments, such as retrieved knowledge 214 of FIG. 2, to the language model, such as LM 218 of FIG. 2, as a plurality of input tokens.

Method 800 then proceeds to block 820 with receiving, from the language model, a first generated response to the user query, the first generated response comprising a first plurality of output tokens. In some aspects, receiving component 914 of FIG. 9 is configured to receive, from the language model, such as LM 218 of FIG. 2, a first generated response to the user query, such as user query 202 of FIG. 2, the first generated response comprising a first plurality of output tokens.

Method 800 then proceeds to block 825 with determining that the first generated response is relevant to the user query. In some aspects, determining component 920 of FIG. 9 is configured to determine that the first generated response, such as generated response 322 of FIG. 3, is relevant to the user query, such as user query 307 of FIG. 3.

Method 800 then proceeds to block 830 with extracting, prior to generating a first set of attention scores, a first set of cross-attention weights of the language model, cross-attention weights 324 of FIG. 3 indicating how much attention each output token of the first plurality of output tokens paid to each input token of the plurality of input tokens. In some aspects, extracting component 922 of FIG. 9 is configured to extract, prior to generating a first set of attention scores, a first set of cross-attention weights of the language model, such as LM 318 of FIG. 3.

Method 800 then proceeds to block 835 with generating the first set of attention scores, such as attention scores 326 of FIG. 3 wherein each attention score corresponds to a respective knowledge segment of the one or more knowledge segments based on the first set of cross-attention weights. In some aspects, generating component 924 of FIG. 9 is configured to generate the first set of attention scores, wherein each attention score corresponds to a respective knowledge segment of the one or more knowledge segments, such as retrieved knowledge 310 of FIG. 3, based on the first set of cross-attention weights.

Method 800 then proceeds to block 840 with identifying, based on the first set of attention scores, a first top-k set of most attended knowledge segments corresponding to a first top-k subset of attention scores of the first set of attention scores. In some aspects, identifying component 926 of FIG. 9 is configured to identify, based on the attention scores 326 of FIG. 3, a first top-k set of most attended knowledge segments corresponding to a first top-k subset of attention scores of the first set of attention scores, such as most attended knowledge segments 328 of FIG. 3.

Method 800 then proceeds to block 845 with labeling, based on determining that the first generated response is relevant to the user query, the first top-k set of most attended knowledge segments as positive examples. In some aspects, labeling component 928 of FIG. 9 is configured to label, based on determining that the first generated response is relevant to the user query, the first top-k set of most attended knowledge segments, such as most attended knowledge segments 328 of FIG. 3, as positive examples.

Method 800 then proceeds to block 850 with modifying one or more parameters of the retrieval augmented generation system to prioritize retrieving the positive examples. In some aspects, modifying component 930 of FIG. 9 is configured to modify one or more parameters of the retrieval augmented generation system to prioritize retrieving the positive examples, such as most attended knowledge segments 328 of FIG. 3.

In some aspects, method 800 includes aggregating the first set of cross-attention weights across a plurality of layers of the language model, a plurality of attention heads of the language model, and the first plurality of output tokens. For example, in some aspects, processing system 900 is configured to aggregate cross-attention weights 324 of FIG. 3 across a plurality of layers of LM 318, a plurality of attention heads of LM 318, and the first plurality of output tokens (e.g., generated response 322 of FIG. 3).

In some aspects, method 800 includes: generating an automated confidence score for the first generated response based on one or more characteristics of the first generated response; and determining that the first generated response is relevant to the user query based on the automated confidence score satisfying a predetermined threshold. In some aspects, generating component 924 of FIG. 9 is configured to generate an automated confidence score for the first generated response, such as generated response 322 of FIG. 3, based on one or more characteristics of the first generated response, and determining component 920 of FIG. 9 is configured to determine that the first generated response is relevant to the user query, such as user query 307 of FIG. 3, based on the automated confidence score satisfying a predetermined threshold.

In some aspects, generating the automated confidence score is based on a semantic similarity between the first generated response and the user query or a coverage of entities or concepts from the user query within the first generated response. In some aspects, generating the automated confidence score comprises: extracting a set of probability estimates associated with the first plurality of output tokens; and generating the automated confidence score based on the set of probability estimates.

In some aspects, method 800 includes receiving user input indicating positive feedback about the first generated response. In some aspects, receiving component 914 of FIG. 9 is configured to receive user input indicating positive feedback about the first generated response, such as generated response 322 of FIG. 3, from a user interface, such as user interface 306 of FIG. 3.

In some aspects, method includes imputing the positive feedback to the first top-k set of most attended knowledge segments as a set of positive labels. In some aspects, labeling component 928 of FIG. 9 is configured to impute the positive feedback to the first top-k set of most attended knowledge segments, such as most attended knowledge segments 328 of FIG. 3, as a set of positive labels.

In some aspects, method 800 further includes applying, based on determining that the first generated response is relevant to the user query, attention-weighted contrastive learning to fine-tune an embedding model of the retrieval augmented generation system by: assigning a contrastive weight to each respective knowledge segment of the one or more knowledge segments based on an attention score corresponding to the respective knowledge segment, wherein the contrastive weight defines a contribution to a contrastive loss of the attention-weighted contrastive learning; computing the contrastive loss based on the contrastive weight of each respective knowledge segment; and based on the contrastive loss, mapping the user query and one or more knowledge segments with higher weighted attention scores closer together and mapping the user query and one or more knowledge segments with lower weighted attention scores further apart.

In some aspects, applying component 932 of FIG. 9 is configured to apply, based on determining that the first generated response is relevant to the user query, attention-weighted contrastive learning to fine-tune an embedding model of the retrieval augmented generation system by assigning a contrastive weight to each respective knowledge segment of the one or more knowledge segments, such as retrieved knowledge 310 of FIG. 3, based on an attention score, such as attention scores 326 of FIG. 3, corresponding to the respective knowledge segment, computing the contrastive loss based on the contrastive weight of each respective knowledge segment, and, based on the contrastive loss, mapping the user query, such as user query 307 of FIG. 3, and one or more knowledge segments with higher weighted attention scores closer together and mapping the user query and one or more knowledge segments with lower weighted attention scores further apart.

In some aspects, method 800 further includes receiving, from the language model, a second generated response to the user query, the second generated response comprising a second plurality of output tokens. In some aspects, receiving component 914 of FIG. 9 is configured to receive, from the language model, such as LM 318 of FIG. 3, a second generated response to the user query, such as user query 307 of FIG. 3, the second generated response comprising a second plurality of output tokens.

In some aspects, method 800 further includes extracting, prior to generating a second set of attention scores, a second set of cross-attention weights of the language model, the second set of cross-attention weights indicating how much attention each output token of the second plurality of output tokens paid to each input token of the plurality of input tokens. In some aspects, extracting component 922 of FIG. 9 is configured to extract, prior to generating a second set of attention scores, a second set of cross-attention weights of the language model, such as LM 318 of FIG. 3, the second set of cross-attention weights indicating how much attention each output token of the second plurality of output tokens, such as generated response 322 of FIG. 3, paid to each input token of the plurality of input tokens, such as augmented prompt 316 of FIG. 3.

In some aspects, method 800 further includes generating the second set of attention scores, wherein each attention score corresponds to a respective knowledge segment of the one or more knowledge segments based on the second set of cross-attention weights. In some aspects, generating component 924 of FIG. 9 is configured to generate the second set of attention scores, wherein each attention score corresponds to a respective knowledge segment of the one or more knowledge segments, such as retrieved knowledge 310 of FIG. 3, based on the second set of cross-attention weights.

In some aspects, method 800 further includes identifying, based on the second set of attention scores, a second top-k set of most attended knowledge segments corresponding to a second top-k subset of attention scores of the second set of attention scores. In some aspects, identifying component 926 of FIG. 9 is configured to identify, based on the second set of attention scores, a second top-k set of most attended knowledge segments corresponding to a second top-k subset of attention scores of the second set of attention scores, such as most attended knowledge segments 328 of FIG. 3.

In some aspects, method 800 further includes determining that the second generated response is irrelevant to the user query. In some aspects, determining component 920 of FIG. 9 is configured to determine that the second generated response, such as generated response 322 of FIG. 3, is irrelevant to the user query, such as user query 307 of FIG. 3.

In some aspects, method 800 further includes labeling, based on determining that the second generated response is irrelevant to the user query, the second top-k set of most attended knowledge segments as negative examples. In some aspects, labeling component 928 of FIG. 9 is configured to label, based on determining that the second generated response is irrelevant to the user query, the second top-k set of most attended knowledge segments, such as most attended knowledge segments 328 of FIG. 3, as negative examples, such as negative examples 614 of FIG. 6

In some aspects, method 800 further includes updating one or more parameters of the retrieval augmented generation system, such as self-supervised RAG service 308 of FIG. 3, to de-prioritize retrieving the negative examples. In some aspects, updating component 936 of FIG. 9 is configured to update one or more parameters of the self-supervised RAG service to de-prioritize retrieving the negative examples, such as negative examples 614 of FIG. 6.

In some aspects, updating one or more parameters of the retrieval augmented generation service, such as self-supervised RAG service 308 of FIG. 3, to de-prioritize retrieving the negative examples comprises adjusting an embedding space associated with the external knowledge base to map user queries and positive examples closer together and to bring user queries and negative examples further apart. In some aspects, adjusting component 934 of FIG. 9 is configured to adjust an embedding space associated with the external knowledge base, such as external knowledge base 312 of FIG. 3, to map user queries, and positive examples, such as positive examples 622 of FIG. 6, closer together and to bring user queries and negative examples, such as negative examples 614 of FIG. 6, further apart.

In some aspects, modifying one or more parameters of the retrieval augmented generation system to prioritize retrieving the positive examples is configured as a self-supervised fine-tuning process that improves a retrieval accuracy and a response quality of the retrieval augmented generation system. In some aspects, modifying component 930 of FIG. 9 is configured to modify one or more parameters of the retrieval augmented generation system to prioritize retrieving the positive examples, such as positive examples 622 of FIG. 6, as a self-supervised fine-tuning process that improves a retrieval accuracy and a response quality of the retrieval augmented generation system.

Method 800 achieves many technical benefits and acts as a technical solution to the technical problems described above by enabling continuous, automated optimization of retrieval accuracy and response quality in RAG systems. By leveraging attention-derived feedback from the language model, method 800 overcomes the lack of explicit user engagement signals-such as clicks—that traditional search engines rely on for improving document ranking. Instead, the method extracts cross-attention weights and generates attention scores to identify which knowledge segments most influenced the generated response. Through labeling these segments as positive or negative examples based on response relevancy, and updating retriever parameters accordingly, method 800 creates a self-supervised feedback loop that adapts to evolving user needs and dynamic content domains. This approach reduces the risk of retriever stagnation, mitigates issues such as retrieval of outdated or irrelevant documents, and decreases the likelihood of hallucinated or low-quality responses. The technical effects include improved robustness, scalability, and responsiveness of RAG systems, directly addressing the limitations of conventional retrieval and response generation architectures.

Note that FIG. 8 is just one example of a method, and other methods including fewer, additional, or alternative operations are possible consistent with this disclosure.

Example Processing System for Modifying a Self-Supervised RAG Service

FIG. 9 depicts an example processing system 900 configured to perform various aspects described herein, including, for example, method 800 as described above with respect to FIG. 8.

Processing system 900 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 900 includes one or more processor(s) 902, one or more input/output device(s) 904, one or more display device(s) 906, one or more network interface(s) 908 through which processing system 900 is connected to one or more networks (e.g., a local network, an intranet, the Internet, or any other group of processing systems communicatively connected to each other), and computer-readable medium 912. In the depicted example, the aforementioned components are coupled by a bus 910, which may generally be configured for data exchange amongst the components. Bus 910 may be representative of multiple buses, while only one is depicted for simplicity.

Processor(s) 902 are generally configured to retrieve and execute instructions stored in one or more memories, including local memories like computer-readable medium 912, as well as remote memories and data stores. Similarly, processor(s) 902 are configured to store application data residing in local memories like the computer-readable medium 912, as well as remote memories and data stores. More generally, bus 910 is configured to transmit programming instructions and application data among the processor(s) 902, display device(s) 906, network interface(s) 908, and/or computer-readable medium 912. In certain embodiments, processor(s) 902 are representative of a one or more central processing units (CPUs), graphics processing unit (GPUs), tensor processing unit (TPUs), accelerators, and other processing devices.

Input/output device(s) 904 may include any device, mechanism, system, interactive display, and/or various other hardware and software components for communicating information between processing system 900 and a user of processing system 900. For example, input/output device(s) 904 may include input hardware, such as a keyboard, touch screen, button, microphone, speaker, and/or other device for receiving inputs from the user and sending outputs to the user.

Display device(s) 906 may generally include any sort of device configured to display data, information, graphics, user interface elements, and the like to a user. For example, display device(s) 906 may include internal and external displays such as an internal display of a tablet computer or an external display for a server computer or a projector. Display device(s) 906 may further include displays for devices, such as augmented, virtual, and/or extended reality devices. In various embodiments, display device(s) 906 may be configured to display a graphical user interface.

Network interface(s) 908 provide processing system 900 with access to external networks and thereby to external processing systems. Network interface(s) 908 can generally be any hardware and/or software capable of transmitting and/or receiving data via a wired or wireless network connection. Accordingly, network interface(s) 908 can include a communication transceiver for sending and/or receiving any wired and/or wireless communication.

Computer-readable medium 912 may be a volatile memory, such as a random access memory (RAM), or a nonvolatile memory, such as nonvolatile random access memory (NVRAM), or the like. In this example, computer-readable medium 912 includes receiving component 914, retrieving component 916, providing component 918, determining component 920, extracting component 922, generating component 924, identifying component 926, labeling component 928, modifying component 930, applying component 932, adjusting component 934, updating component 936, assigning component 938, computing component 940. Processing of the components 914-940 may enable and cause the processing system 900 to perform the method 800 described with respect to FIG. 8, or any aspect related to it.

In certain embodiments, receiving component 914 is configured to receive a user query, as described above with reference to block 805 of FIG. 8. In certain embodiments, retrieving component 916 is configured to retrieve one or more knowledge segments from an external knowledge base associated with a language model based on the user query, as described above with reference to block 810 of FIG. 8. In certain embodiments, providing component 918 is configured to provide a prompt comprising the user query and the information to the language model as a plurality of input tokens, as described above with reference to block 815 of FIG. 8. In certain embodiments, receiving component 914 is configured to receive, from the language model, a first generated response to the user query, the first generated response comprising a first plurality of output tokens, as described above with reference to block 820 of FIG. 8. In certain embodiments, determining component 920 is configured to determine that the first generated response is relevant to the user query, as described above with reference to block 825 of FIG. 8. In certain embodiments, prior to generating a first set of attention scores, a first set of cross-attention weights of the language model, extracting component 922 is configured to extract the first set of cross-attention weights indicating how much attention each output token of the first plurality of output tokens paid to each input token of the plurality of input tokens, as described above with reference to block 830 of FIG. 8. In certain embodiments, generating component 924 is configured to generate the first set of attention scores, wherein each attention score corresponds to a respective knowledge segment of the one or more knowledge segments based on the first set of cross-attention weights, as described above with reference to block 835 of FIG. 8. In certain embodiments, based on the first set of attention scores, identifying component 926 is configured to identify a first top-k set of most attended knowledge segments corresponding to a first top-k subset of attention scores of the first set of attention scores, as described above with reference to block 840 of FIG. 8. In certain embodiments, based on determining that the first generated response is relevant to the user query, labeling component 928 is configured to label the first top-k set of most attended knowledge segments as positive examples, as described above with reference to block 845 of FIG. 8. In certain embodiments, modifying component 930 is configured to modify one or more parameters of the retrieval augmented generation system to prioritize retrieving the positive examples, as described above with reference to block 850 of FIG. 8.

Note that FIG. 8 is just one example of a processing system consistent with aspects described herein, and other processing systems having additional, alternative, or fewer components are possible consistent with this disclosure.

Example Clauses

Implementation examples are described in the following numbered clauses:

Clause 1: A method for modifying a retrieval augmented generation system, comprising: receiving a user query; retrieving one or more knowledge segments from an external knowledge base associated with a language model based on the user query; providing a prompt comprising the user query and the one or more knowledge segments to the language model as a plurality of input tokens; receiving, from the language model, a first generated response to the user query, the first generated response comprising a first plurality of output tokens; determining that the first generated response is relevant to the user query; extracting, prior to generating a first set of attention scores, a first set of cross-attention weights of the language model, the first set of cross-attention weights indicating how much attention each output token of the first plurality of output tokens paid to each input token of the plurality of input tokens; generating the first set of attention scores, wherein each attention score corresponds to a respective knowledge segment of the one or more knowledge segments based on the first set of cross-attention weights; identifying, based on the first set of attention scores, a first top-k set of most attended knowledge segments corresponding to a first top-k subset of attention scores of the first set of attention scores; labeling, based on determining that the first generated response is relevant to the user query, the first top-k set of most attended knowledge segments as positive examples; and modifying one or more parameters of the retrieval augmented generation system to prioritize retrieving the positive examples.

Clause 2: The method of Clause 1, wherein generating the first set of attention scores comprises aggregating the first set of cross-attention weights across a plurality of layers of the language model, a plurality of attention heads of the language model, and the first plurality of output tokens.

Clause 3: The method of any one of Clauses 1-2, wherein determining whether the first generated response is relevant to the user query comprises: generating an automated confidence score for the first generated response based on one or more characteristics of the first generated response; and determining that the first generated response is relevant to the user query based on the automated confidence score satisfying a predetermined threshold.

Clause 4: The method of Clause 3, wherein generating the automated confidence score is based on a semantic similarity between the first generated response and the user query or a coverage of entities or concepts from the user query within the first generated response.

Clause 5: The method of Clause 3, wherein generating the automated confidence score comprises: extracting a set of probability estimates associated with the first plurality of output tokens; and generating the automated confidence score based on the set of probability estimates.

Clause 6: The method of any one of Clauses 1-5, wherein determining that the first generated response is relevant to the user query comprises receiving user input indicating positive feedback about the first generated response.

Clause 7: The method of Clause 6, wherein labeling the first top-k set of most attended knowledge segments comprises imputing the positive feedback to the first top-k set of most attended knowledge segments as a set of positive labels.

Clause 8: The method of any one of Clauses 1-7, further comprising: applying, based on determining that the first generated response is relevant to the user query, attention-weighted contrastive learning to fine-tune an embedding model of the retrieval augmented generation system by: assigning a contrastive weight to each respective knowledge segment of the one or more knowledge segments based on an attention score corresponding to the respective knowledge segment, wherein the contrastive weight defines a contribution to a contrastive loss of the attention-weighted contrastive learning; computing the contrastive loss based on the contrastive weight of each respective knowledge segment; and based on the contrastive loss, mapping the user query and one or more knowledge segments with higher weighted attention scores closer together and mapping the user query and one or more knowledge segments with lower weighted attention scores further apart.

Clause 9: The method of any one of Clauses 1-8, further comprising: receiving, from the language model, a second generated response to the user query, the second generated response comprising a second plurality of output tokens; extracting, prior to generating a second set of attention scores, a second set of cross-attention weights of the language model, the second set of cross-attention weights indicating how much attention each output token of the second plurality of output tokens paid to each input token of the plurality of input tokens; generating the second set of attention scores, wherein each attention score corresponds to a respective knowledge segment of the one or more knowledge segments based on the second set of cross-attention weights; identifying, based on the second set of attention scores, a second top-k set of most attended knowledge segments corresponding to a second top-k subset of attention scores of the second set of attention scores; determining that the second generated response is irrelevant to the user query; labeling, based on determining that the second generated response is irrelevant to the user query, the second top-k set of most attended knowledge segments as negative examples;

and updating one or more parameters of the retrieval augmented generation system to de-prioritize retrieving the negative examples.

Clause 10: The method of any one of Clauses 1-9, wherein updating one or more parameters of the retrieval augmented generation system to de-prioritize retrieving the negative examples comprises adjusting an embedding space associated with the external knowledge base to map user queries and positive examples closer together and to bring user queries and negative examples further apart.

Clause 11: The method of any one of Clauses 1-10, wherein modifying one or more parameters of the retrieval augmented generation system to prioritize retrieving the positive examples is configured as a self-supervised fine-tuning process that improves a retrieval accuracy and a response quality of the retrieval augmented generation system.

Clause 12: A processing system, comprising: memory comprising computer-executable instructions; and one or more processors configured to execute the computer-executable instructions and cause the processing system to perform a method in accordance with any one of Clauses 1-11.

Clause 13: A processing system, comprising means for performing a method in accordance with any one of Clauses 1-11.

Clause 14: A non-transitory computer-readable medium storing program code for causing a processing system to perform the steps of any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for modifying a retrieval augmented generation system, comprising:
   receiving a user query;
   retrieving one or more knowledge segments from an external knowledge base associated with a language model based on the user query;
   providing a prompt comprising the user query and the one or more knowledge segments to the language model as a plurality of input tokens;
   receiving, from the language model, a first generated response to the user query, the first generated response comprising a first plurality of output tokens;
   determining that the first generated response is relevant to the user query;
   prior to generating a first set of attention scores, extracting a first set of cross-attention weights of the language model, the first set of cross-attention weights indicating how much attention each output token of the first plurality of output tokens paid to each input token of the plurality of input tokens;
   generating the first set of attention scores, wherein each attention score corresponds to a respective knowledge segment of the one or more knowledge segments based on the first set of cross-attention weights;

based on the first set of attention scores, identifying a first top-k set of most attended knowledge segments corresponding to a first top-k subset of attention scores of the first set of attention scores;

based on determining that the first generated response is relevant to the user query, labeling the first top-k set of most attended knowledge segments as positive examples; and modifying one or more parameters of the retrieval augmented generation system to prioritize retrieving the positive examples.

2. The method of claim 1, wherein generating the first set of attention scores comprises aggregating the first set of cross-attention weights across a plurality of layers of the language model, a plurality of attention heads of the language model, and the first plurality of output tokens.

3. The method of claim 1, wherein determining whether the first generated response is relevant to the user query comprises:
generating an automated confidence score for the first generated response based on one or more characteristics of the first generated response; and
determining that the first generated response is relevant to the user query based on the automated confidence score satisfying a predetermined threshold.

4. The method of claim 3, wherein generating the automated confidence score is based on a semantic similarity between the first generated response and the user query or a coverage of entities or concepts from the user query within the first generated response.

5. The method of claim 3, wherein generating the automated confidence score comprises:
extracting a set of probability estimates associated with the first plurality of output tokens; and
generating the automated confidence score based on the set of probability estimates.

6. The method of claim 1, wherein determining that the first generated response is relevant to the user query comprises receiving user input indicating positive feedback about the first generated response.

7. The method of claim 6, wherein labeling the first top-k set of most attended knowledge segments comprises imputing the positive feedback to the first top-k set of most attended knowledge segments as a set of positive labels.

8. The method of claim 1, further comprising:
based on determining that the first generated response is relevant to the user query, applying attention-weighted contrastive learning to fine-tune an embedding model of the retrieval augmented generation system by:
assigning a contrastive weight to each respective knowledge segment of the one or more knowledge segments based on an attention score corresponding to the respective knowledge segment, wherein the contrastive weight defines a contribution to a contrastive loss of the attention-weighted contrastive learning;
computing the contrastive loss based on the contrastive weight of each respective knowledge segment; and
based on the contrastive loss, mapping the user query and one or more knowledge segments with higher weighted attention scores closer together and mapping the user query and one or more knowledge segments with lower weighted attention scores further apart.

9. The method of claim 1, further comprising:
receiving, from the language model, a second generated response to the user query, the second generated response comprising a second plurality of output tokens;
prior to generating a second set of attention scores, extracting a second set of cross-attention weights of the language model, the second set of cross-attention weights indicating how much attention each output token of the second plurality of output tokens paid to each input token of the plurality of input tokens;
generating the second set of attention scores, wherein each attention score corresponds to a respective knowledge segment of the one or more knowledge segments based on the second set of cross-attention weights;
based on the second set of attention scores, identifying a second top-k set of most attended knowledge segments corresponding to a second top-k subset of attention scores of the second set of attention scores;
determining that the second generated response is irrelevant to the user query;
based on determining that the second generated response is irrelevant to the user query, labeling the second top-k set of most attended knowledge segments as negative examples; and
updating the one or more parameters of the retrieval augmented generation system to de-prioritize retrieving the negative examples.

10. The method of claim 9, wherein updating the one or more parameters of the retrieval augmented generation system to de-prioritize retrieving the negative examples comprises adjusting an embedding space associated with the external knowledge base to map user queries and the positive examples closer together and to bring user queries and negative examples further apart.

11. The method of claim 1, wherein modifying the one or more parameters of the retrieval augmented generation system to prioritize retrieving the positive examples is configured as a self-supervised fine-tuning process that improves a retrieval accuracy and a response quality of the retrieval augmented generation system.

12. A processing system, comprising: memory comprising computer-executable instructions; and one or more processors configured to execute the computer-executable instructions and cause the processing system to:
receive a user query;
retrieve one or more knowledge segments from an external knowledge base associated with a language model based on the user query;
provide a prompt comprising the user query and the one or more knowledge segments to the language model as a plurality of input tokens;
receive, from the language model, a first generated response to the user query, the first generated response comprising a first plurality of output tokens;
determine that the first generated response is relevant to the user query;
extract, prior to generating a first set of attention scores, a first set of cross-attention weights of the language model, the first set of cross-attention weights indicating how much attention each output token of the first plurality of output tokens paid to each input token of the plurality of input tokens;
generate the first set of attention scores, wherein each attention score corresponds to a respective knowledge segment of the one or more knowledge segments based on the first set of cross-attention weights;

identify, based on the first set of attention scores, a first top-k set of most attended knowledge segments corresponding to a first top-k subset of attention scores of the first set of attention scores;

label, based on determining that the first generated response is relevant to the user query, the first top-k set of most attended knowledge segments as positive examples; and modify one or more parameters of a retrieval augmented generation system implementing the language model to prioritize retrieving the positive examples.

13. The processing system of claim 12, wherein to cause the processing system to generate the first set of attention scores, the one or more processors are configured to execute the computer-executable instructions and cause the processing system to aggregate the first set of cross-attention weights across a plurality of layers of the language model, a plurality of attention heads of the language model, and the first plurality of output tokens.

14. The processing system of claim 12, wherein to cause the processing system to determine whether the first generated response is relevant to the user query, the one or more processors are configured to execute the computer-executable instructions and cause the processing system to:

generate an automated confidence score for the first generated response based on one or more characteristics of the first generated response; and determine that the first generated response is relevant to the user query based on the automated confidence score satisfying a predetermined threshold.

15. The processing system of claim 14, wherein to cause the processing system to generate the automated confidence score is based on a semantic similarity between the first generated response and the user query or a coverage of entities or concepts from the user query within the first generated response.

16. The processing system of claim 14, wherein to cause the processing system to generate the automated confidence score, the one or more processors are configured to execute the computer-executable instructions and cause the processing system to:

extract a set of probability estimates associated with the first plurality of output tokens; and generate the automated confidence score based on the set of probability estimates.

17. The processing system of claim 12, wherein to cause the processing system to determine that the first generated response is relevant to the user query, the one or more processors are configured to execute the computer-executable instructions and cause the processing system to receive user input indicating positive feedback about the first generated response.

18. The processing system of claim 17, wherein to cause the processing system to label the first top-k set of most attended knowledge segments, the one or more processors are configured to execute the computer-executable instructions and cause the processing system to impute the positive feedback to the first top-k set of most attended knowledge segments as a set of positive labels.

19. The processing system of claim 12, wherein the one or more processors are configured to execute the computer-executable instructions and cause the processing system to:

based on determining that the first generated response is relevant to the user query, apply attention-weighted contrastive learning to fine-tune an embedding model of the retrieval augmented generation system by:

assigning a contrastive weight to each respective knowledge segment of the one or more knowledge segments based on an attention score corresponding to the respective knowledge segment, wherein the contrastive weight defines a contribution to a contrastive loss of the attention-weighted contrastive learning;

computing the contrastive loss based on the contrastive weight of each respective knowledge segment; and based on the contrastive loss, mapping the user query and one or more knowledge segments with higher weighted attention scores closer together and mapping the user query and one or more knowledge segments with lower weighted attention scores further apart.

20. The processing system of claim 12, wherein the one or more processors are configured to execute the computer-executable instructions and cause the processing system to:

receive, from the language model, a second generated response to the user query, the second generated response comprising a second plurality of output tokens;

extract, prior to generating a second set of attention scores, a second set of cross-attention weights of the language model, the second set of cross-attention weights indicating how much attention each output token of the second plurality of output tokens paid to each input token of the plurality of input tokens;

generate the second set of attention scores, wherein each attention score corresponds to a respective knowledge segment of the one or more knowledge segments based on the second set of cross-attention weights;

based on the second set of attention scores, identify a second top-k set of most attended knowledge segments corresponding to a second top-k subset of attention scores of the second set of attention scores;

determine that the second generated response is irrelevant to the user query;

based on determining that the second generated response is irrelevant to the user query, label the second top-k set of most attended knowledge segments as negative examples; and update the one or more parameters of the retrieval augmented generation system to de-prioritize retrieving the negative examples.

\* \* \* \* \*